(12) United States Patent
Takenaka et al.

(10) Patent No.: US 6,505,096 B2
(45) Date of Patent: *Jan. 7, 2003

(54) POSTURE CONTROL SYSTEM OF LEGGED MOBILE ROBOT

(75) Inventors: Toru Takenaka, Wako (JP); Tadaaki Hasegawa, Wako (JP); Takashi Matsumoto, Wako (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/319,266

(22) PCT Filed: Dec. 19, 1997

(86) PCT No.: PCT/JP97/04723

§ 371 (c)(1),
(2), (4) Date: Aug. 16, 1999

(87) PCT Pub. No.: WO98/26905

PCT Pub. Date: Jun. 25, 1998

(65) Prior Publication Data

US 2002/0022907 A1 Feb. 21, 2002

(30) Foreign Application Priority Data

Dec. 19, 1996 (JP) .............................................. 8-354561

(51) Int. Cl.$^7$ .............................. G06F 19/00; B25J 5/00

(52) U.S. Cl. .................................. 700/245; 318/568.12

(58) Field of Search ................................. 700/245, 254, 700/260, 261; 318/566, 568.12, 568.17; 345/473–475; 901/1

(56) References Cited

U.S. PATENT DOCUMENTS

| | | | | |
|---|---|---|---|---|
| 5,357,433 A | * | 10/1994 | Takenaka et al. .............. 701/23 |
| 5,404,086 A | * | 4/1995 | Takenaka et al. ...... 318/568.12 |
| 5,459,659 A | * | 10/1995 | Takenaka .................... 700/260 |
| 5,513,106 A | | 4/1996 | Yoshino et al. |
| 5,625,577 A | * | 4/1997 | Kunii et al. ................... 703/2 |
| 4,834,200 A | | 5/1999 | Kajita et al. |

FOREIGN PATENT DOCUMENTS

| | | |
|---|---|---|
| JP | 62-97005 | 5/1987 |
| JP | 4-15068 | 3/1992 |
| JP | 5-62363 | 9/1993 |
| JP | 5-337849 | 12/1993 |
| JP | 7-205069 | 8/1995 |

OTHER PUBLICATIONS

Yamaguchi J. et al. "Development of a Biped Walking Robot Compensating for Three–Axis Moment by Trunk Motion" Proceedings of the IEE/RSJ International Conference on Intelligent robots and Systems, US, New York, IEE, vol. —, Jul. 26, 1993, p. 561–566, XP00437916 *the whole document*.

(List continued on next page.)

Primary Examiner—Thu Nguyen
(74) Attorney, Agent, or Firm—Arent Fox Kintner Plotkin & Kahn

(57) ABSTRACT

In a legged mobile robot, in particular a biped robot having arms, the control is conducted such that the dynamic balance is preserved so as to keep a stable posture, even when the robot is subject to unexpected reaction force from an object. It is configured such that the difference or error (i.e., moment about the central point of total floor reaction force) between the desired object reaction force, and the actual value is determined and is distributed to the desired body position/posture and the desired feet position/posture, and based thereon, robot link joints are controlled to be driven.

20 Claims, 12 Drawing Sheets

OTHER PUBLICATIONS

"Development of a Biped Walking Robot Compensating for Three–Axis Moment by Trunk Motion", Yamaguchi et al, *Journal of the Robotics Society of Japan*, vol. 11, No. 4, May 1993, pp. 101–106.
Translation of Japanese publication No. 07–205069, Masao et al.*

Masaao et al, "Walk Controller of Leg Moving Robert", (Jpo publicaation No. 07–205069) (machine translation version) Aug. 1995.*
Takenaka, "Attitude Stabilization control Device for Leg Type Mobile Robot", (Jpo publicaation No. 05–337849) (machine translation version) Dec. 1993.*

* cited by examiner

FIG.7

MOMENT DIFFERENCE OF OBJECT REACTION FORCE
(ACTUAL MOMENT OF OBJECT REACTION FORCE-
DESIRED MOMENT OF OBJECT REACTION FORCE)

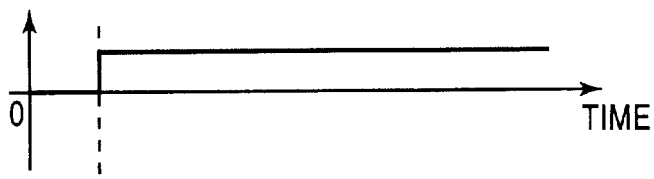

COMPENSATING MOMENT OF TOTAL FLOOR REACTION FORCE FOR
OBJECT REACTION FORCE EQUILIBRIUM CONTROL

PERTURBATION AMOUNT OF DESIRED MOMENT OF INERTIAL FORCE
+ PERTURBATION AMOUNT OF DESIRED MOMENT OF GRAVITY

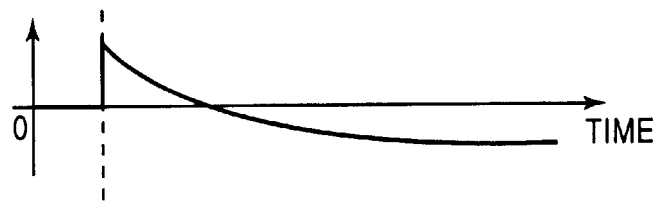

PERTURBATION AMOUNT OF DESIRED CENTER OF
GRAVITY POSITION

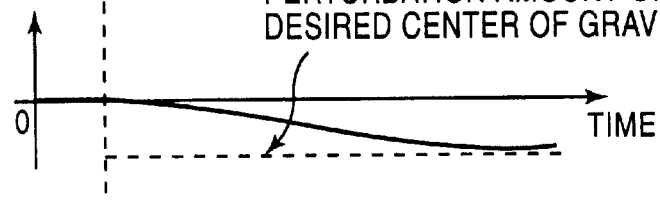

PERTURBATION AMOUNT OF FINAL
DESIRED CENTER OF GRAVITY POSITION

PERTURBATION AMOUNT OF
DESIRED BODY POSITION

ROTARY-TYPE ACTUATOR

MOMENT OF INERTIA I

ROTARY-TYPE ACTUATOR

POSTURE CONTROL SYSTEM OF LEGGED MOBILE ROBOT

TECHNICAL FIELD TO WHICH THE INVENTION RELATES

The present invention relates to a posture control system of a legged mobile robot, and specifically to a system for ensuring that a legged mobile robot, in particular a biped walking robot, reserves dynamic balance to maintain a stable posture, even when the robot is subject to unexpected object reaction force. More specifically, the present invention is most effectively applicable in a legged mobile robot having arms, and coordinately controls the arms and legs of the robot.

It should be noted that in this specification the term "object reaction force" is used to indicate the external force acting on the robot in a working environment including an object with which the robot is working, but excluding the floor reaction force acting on the robot from the contacting floor.

BACKGROUND ART OF THE INVENTION

A legged mobile robot, in particular a biped walking robot having arms, is known from, for example, "Development of a Biped Walking Robot Compensating for Three-Axis Moment by Trunk Motion" in vol. 11. No. 4, May 1993; "Journal of the Robotics Society of Japan". The robot is provided with balance weights in the form of simplified arms. A desired gait is designed in advance using variables including anticipated gravity and inertial force to be generated by swinging the balance weights and robot walking is controlled to follow the designed gait.

In the prior art, however, the control is based on the premise that the arms are subject to no object reaction force. Therefore, if the control disclosed in the prior art is applied not only to walking, but also to working, the robot would be likely to lose dynamic balance, if it is subject to unexpected object reaction force from an object, resulting in the posture becoming unstable or, at worst, tipping over.

The applicant discloses a similar legged mobile robot in Japanese Laid-open Patent Application No. Hei 7 (1995)-205069 and proposes forcibly swinging robot arms to restore posture stability when the frictional force on the contact floor drops during walking.

In the control of legged mobile robot proposed therein by the applicant, however, the legs and arms are not controlled coordinately, but are separately or independently controlled. As a result, the robot may sometime lose dynamic balance due to the resultant force comprised of the force of gravity and inertial force generated by the arm swinging and reaction force from an object, thereby, contrary to what is expected, falling into an unstable posture.

A first object of the present invention is to solve the drawbacks of the prior art and to provide a posture control system for a legged mobile robot which can ensure to reserve dynamic balance or equilibrium so as to maintain a stable posture even when the legged mobile robot is subject to unexpected object reaction force.

A second object of the present invention is to provide a posture control system for a legged mobile robot which can effectively prevent the robot from tilting or tipping, even when the object reaction force changes abruptly, by displacing the position of center of gravity of the robot to a position at which the force is statically balanced.

A third object of the present invention is to provide a posture control system for a legged mobile robot which can maintain dynamic balance or equilibrium by properly changing the position of center of gravity of the robot and the floor reaction force even under a transit during which the displacement of position of center of gravity of the robot is in progress in response to the abrupt change of the object reaction force.

A fourth object of the present invention is to provide a posture control system for a legged mobile robot with arms which can reserve dynamic balance or equilibrium so as to maintain a stable posture, even when the robot arm is subject to unexpected gravity and inertial force or unexpected object reaction force when the robot arm is moved in a motion pattern not anticipated beforehand.

DISCLOSURE OF THE INVENTION

In order to achieve the above-mentioned objects, the present invention is configured to have a system for controlling posture of a legged mobile robot having at least a body and a plurality of links each connected to the body, comprising: desired gait predetermining means for predetermining a desired gait of the robot including at least a motion pattern including at least a desired trajectory of the body of the robot, a desired trajectory of floor reaction force acting on the robot, and a desired trajectory of external force other than the floor reaction force, acting on the robot; external force detecting means for detecting the external force other than the floor reaction force; external force difference determining means for determining an external force difference between the detected external force other than the floor reaction force and the external force of the desired trajectory; a model expressing a relationship between perturbation of the floor reaction force and perturbation of at least one of a position of center of gravity and a position of the body of the robot; model input amount determining means for determining a model input amount to be inputted to the model based on at least the determined external force difference; desired body trajectory correcting amount determining means for operating to input the model input amount to the model and based on a perturbation amount of at least one of the position of center of gravity and the position of the body obtained therefrom, for determining a desired body trajectory correcting amount, which corrects the desired trajectory of the body; desired floor reaction force trajectory correcting amount determining means for determining a desired floor reaction force trajectory correcting amount, which corrects the desired trajectory of the floor reaction force, based on at least the determined model input amount; and joint displacing means for displacing joints of the robot based on at least the determined desired body trajectory correcting amount and the desired floor reaction force trajectory correcting amount.

It should be noted here that the "position" is used to indicate, except for the position of gravity, the "position and/or posture". The "posture" indicates the orientation or direction in the three-dimensional space as will be stated later.

It should be noted here that the "desired trajectory of floor reaction force" is used to indicate, more specifically, a desired trajectory of a central point of floor reaction force. It should also be noted that "corrects the desired trajectory of the floor reaction force" is used to indicate, more specifically, correction of the moment about the central point of floor reaction force.

It should further be noted here that "detecting the external force" is used to mean not only to detect, but also to estimate with the use of a disturbance observer.

It is configured in the system, the model input amount determining means includes: equilibrium center of gravity position perturbation amount determining means for determining a perturbation amount of an equilibrium position of the center of gravity at which the external force is statically balanced; and wherein the model input amount determining means determines the model input amount such the model converges to the perturbation amount of equilibrium position of the center of gravity.

It is configured in the system, the model is a model which approximates the robot by an inverted pendulum.

It is configured in the system, the equilibrium center of gravity position perturbation amount determining means includes: a limiter which limits the determined perturbation amount of equilibrium position of center of gravity within a predetermining range.

It is configured in the system, the desired floor reaction force trajectory correcting amount determining means includes: a limiter which limits the determined desired floor reaction force trajectory correcting amount within a predetermined range.

It is configured in the system, the desired trajectory of the floor reaction force includes at least a desired trajectory of a central point of the floor reaction force acting on the robot.

It is configured in the system, the desired floor reaction force trajectory correcting amount determining means determines the desired floor reaction force trajectory correcting amount such that the desired floor reaction force trajectory correcting amount is equal to a difference obtained by subtracting the external force difference from the model input amount.

It is configured in the system, the external force other than the floor reaction force is a reaction force acting on the robot from an object through the links.

It is configured in the system, the robot is a legged mobile robot having two leg links and two arm links each connected to the body.

The present invention is further configured to have a system for controlling a posture of a legged mobile robot having at least a body and a plurality of links each connected to the body, comprising: desired gait predetermining means for predetermining desired gait of the robot including at least a motion pattern including at least a desired position of the body of the robot and a trajectory of a desired central point of floor reaction force acting on the robot; object reaction force detecting means for detecting an object reaction force acting on the robot from an object through the links; object reaction force moment converting means for converting or transforming the detected object reaction force into a moment about the desired central point of the floor reaction force; robot position/posture correcting means for correcting the moment of the floor reaction force about the desired central point of the floor reaction force and a position and posture of the robot so as to dynamically counterbalance the converted moment of the object reaction force; and joint displacing means for displacing joints of the robot based on the corrected moment of floor reaction force about the desired central point of the floor reaction force and the corrected position and posture of the robot.

The present invention is configured to have a system for controlling posture of a legged mobile robot having at least a body and a plurality of links each connected to the body, comprising: desired gait predetermining means for predetermining a motion pattern including at least a desired position of the body of the robot; object reaction force detecting means for detecting an object reaction force acting on the robot from an object through the links; object reaction force moment converting means for converting the detected object reaction force into a moment about a predetermined point; robot position/posture correcting means for correcting a moment of the floor reaction force about the predetermined point of a floor reaction force and a position and posture of the robot so as to dynamically counterbalance the converted moment; and joint displacing means for displacing joints of the robot based on the corrected moment of the floor reaction force about the predetermined point of the floor reaction force and the corrected position and posture of the robot.

It should be noted in the above that the "legged mobile robot" includes a legged mobile robot which is subject to the object reaction force through portions other than the arms. With respect to the arm links, it should also be noted that the arm links would include any links (including even the leg links) which act on an object. For example, if the robot is a insect-type robot with six legs which lifts an object using the two forelegs, the two forelegs should be considered as the arm links.

BRIEF DESCRIPTION OF THE DRAWINGS

FIG. 7 is a set of time charts explaining the operation of an object reaction force equilibrium controller illustrated in FIG. 3;

DETAILED DESCRIPTION OF THE PREFERRED EMBODIMENTS

The posture control system of a legged mobile robot according to the present invention will be explained with reference to the accompanied drawings. A biped robot is taken as an example of the legged mobile robot.

Figure 1:
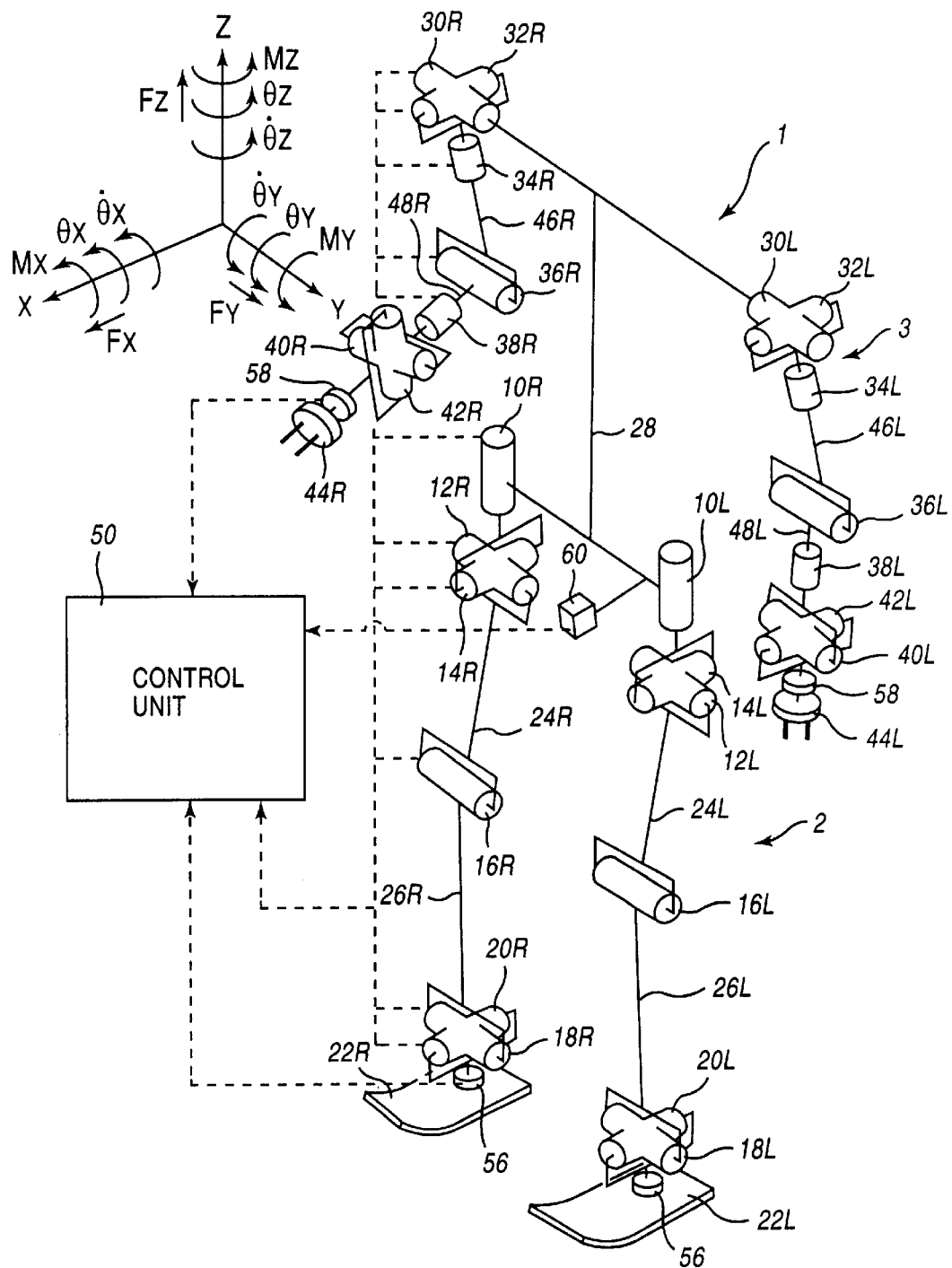
FIG. 1 is a schematic view showing an overall configuration of a posture control system of a legged mobile robot according to the present invention.

FIG. 1 is a schematic view showing an overall configuration of the system including a biped robot 1 according to the present invention.

As illustrated in the figure, the robot 1 has a pair of right and left leg links 2 each composed of six joints. In a simple representation, each of the joints is represented by an electric motor which actuates the joint. The six joints include, arranged successively downward, a pair of hip joints 10R, 10L (the right-hand joint is indicated by R and the left-hand joint by L) for rotating legs with respect to hips, a pair of hip joints 12R, 12L in the pitching axis (about a Y-axis), a pair of hip joints 14R, 14L in the rolling axis (about an X-axis), a pair of knee joints 16R, 16L in the pitching axis, a pair of ankle joints 18R, 18L in the pitching axis, and a pair of joints 20R 20L in the rolling axis. The robot is provided with feet 22R, 22L at its bottom.

The joints 10R(L), 12R(L), 14R(L) make up the hip joints, and the joints 18R(L), 20R(L) make up the ankle joints. The hip joints and knee joints are connected to each other by thigh links 24R, 24L, and the knee joints and ankle joints are connected to each other by crus or shank links 26R, 26L.

The robot has a body or trunk (expressed in a link) 28 above the hip and has a pair of right and left arm links 3 each comprised of seven joints (similarly, each of the joints is represented by an electric motor which actuates the joint). The seven joints include, arranged successively downward, a pair of shoulder joints 30R, 30L in the pitching axis, a pair of shoulder joints 32R, 32L in the rolling axis, a pair of shoulder joints for rotating arms with respect to shoulders, a pair of elbow joints 36R, 36L in the pitching axis, a pair of wrist joints 38R, 38L for rotating hands with respect to arms, a pair wrist joints 40R, 40L in the pitching axis, and a pair of wrist joints 42R, 42L in the rolling axis. Hands (hand effectors) 44R, 44L are connected to the wrists.

The joints 30R(L), 32R(L), 34R(L) make up shoulder joints, and the joints 38R(L), 40R(L) , 42R(L) make up wrist joints. The shoulder joints and elbow joints are connected to each other by upper arm links 46R, 46L, and the elbow joints and wrist joints are connected to each other by lower arm links 48R, 48L.

The body (trunk) 28 houses therein a control unit 50 comprising microcomputers which will be described later with reference to FIG. 2.

With the above structure, each of the leg links 2 is given six degrees of freedom. When the 6*2=12 joints are driven to suitable angles during walking, a desired motion is imparted to the entire leg structure to cause the robot to walk arbitrarily in a three-dimensional (absolute) environment. (In the specification, "*" represents multiplication.). It should be noted that, as mentioned above, the forward-aft direction with respect to the robot (the rolling axis) is expressed as X-axis, the right-and-left directions (pitching axis) are expressed in the Y-axis, and the vertical (direction of gravity) is expressed as Z-axis.

Each of the arm links 3 is given seven degrees of freedom. When the 7*2=14 joints are driven to suitable angles, a desired motion is imparted to cause the robot to conduct a desired work task such as pushing a truck, as will be explained later.

As shown in FIG. 1, a known force sensor (more precisely, known as the six-axis force and torque sensor) 56 is disposed at each foot 22R(L) below the ankle joint for measuring three directional components Fx, Fy, Fz of force and three directional components Mx, My, Mz of torque or moment thereby of the external force which acts on the robot through the foot assembly when it contacts the floor.

Similar force sensor 58 is disposed at a location between each wrist joint and the hand 44R(L) for measuring three directional components Fx, Fy, Fz of force and three directional components Mx, My, Mz of torque or moment thereby of the other external force, in particular the aforesaid object reaction force acting from the object.

Moreover, the body 28 has an inclination sensor 60 for detecting tipping or inclination in the frontal plane with respect to a Z-axis (the vertical direction or the direction of gravity) and its angular velocity (rate), and also a tilt in the sagittal plane with respect to the Z-axis and its angular velocity. The electric motors of the respective joints displace the links 24R(L), 26R(L), etc, through respective speed reducers (not shown) which reduce the rotational speed of the motor output to increase torque. The electric motors are coupled with respective rotary encoders for detecting angular displacements of the electric motors. Thus, the leg links and the arm links are constituted as a leg actuator or an arm actuator each having such a displacement detector. The outputs of the force sensor 56, etc., are sent to the control unit 50. (For brevity, only the sensor outputs at the right side are illustrated in the figure.)

Figure 2:
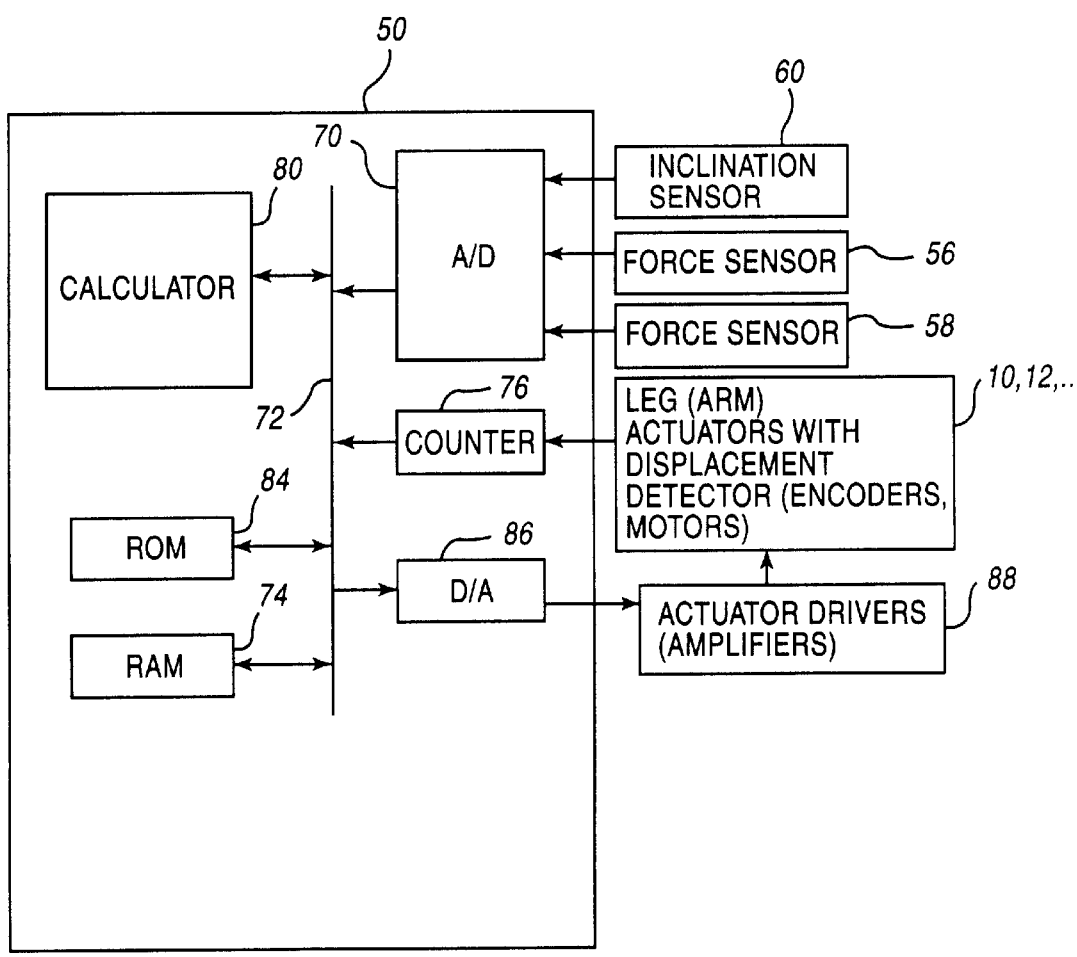
FIG. 2 is a block diagram showing details of a control unit of the robot illustrated in FIG. 1.

FIG. 2 is a block diagram which shows the details of the control unit 50, which is comprised of microcomputers. Outputs from the inclination sensor 60, etc., are converted by an A/D converter 70 into digital signals, which are transmitted through a bus 72 to a RAM 74. Output signals from the rotary encoders that are disposed adjacent to the respective electric motors are transmitted through a counter 76 to the RAM 74.

The control unit 50 includes a calculator 80 comprising CPUs. The calculator 80 calculates desired joint angle displacement commands (displacement command for the actuators) based on a gait prepared beforehand such that the robot can keep a stable posture, and outputs the same to the RAM 74.

Moreover, the calculator 80 reads the desired command values and the detected joint angles from the RAM 74, and calculates values (manipulated variables) and outputs the same through a D/A converter 86 and servo-amplifiers to the electric motors of the respective leg and arm actuators which drive the respective joints.

Figure 3:
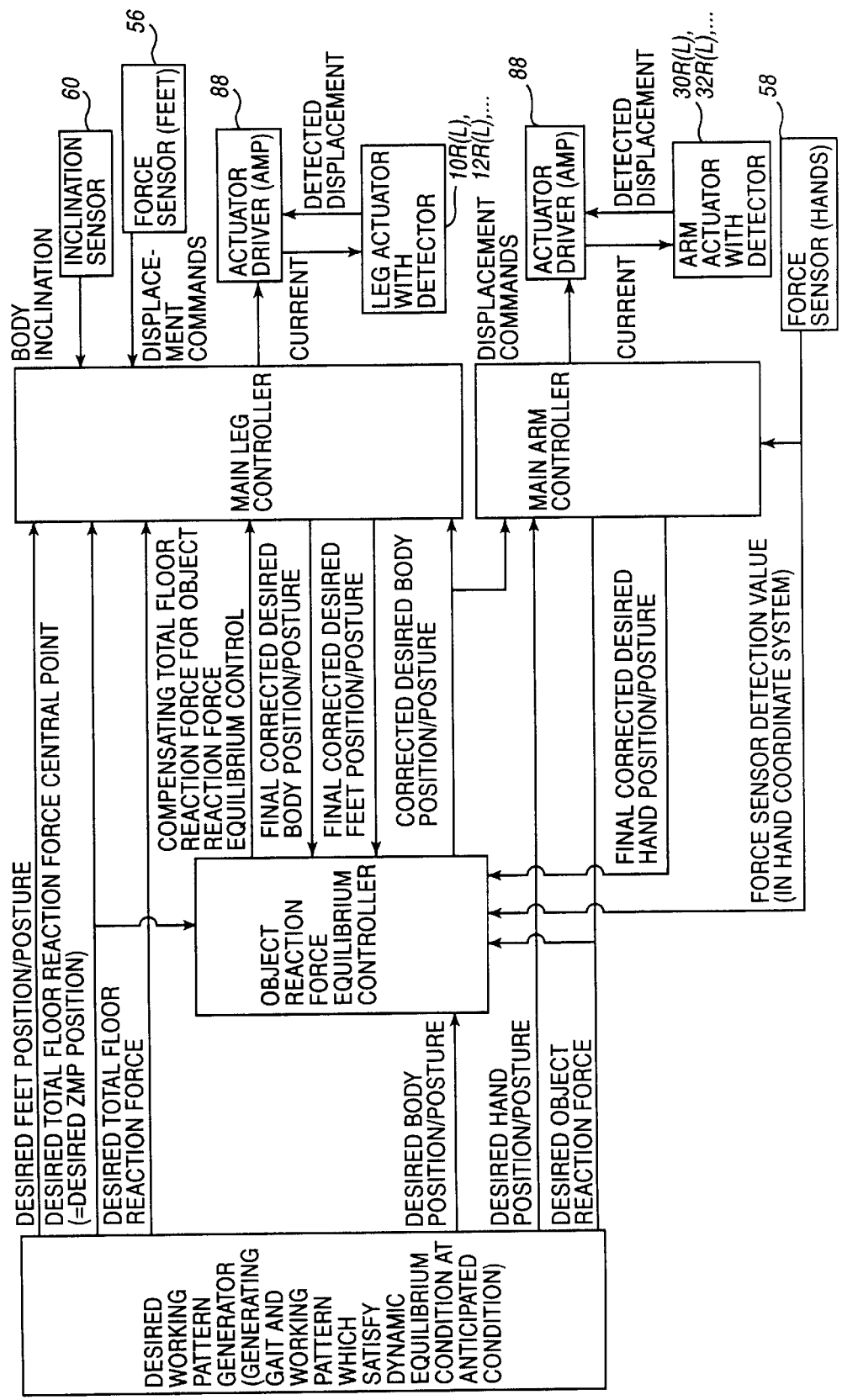
FIG. 3 is a block diagram showing the configuration and operation of the posture system of a legged mobile robot according to the present invention.

FIG. 3 is a block diagram showing the configuration and operation of the posture control system of a legged mobile robot, more specifically the aforesaid calculator 80, according to the present invention in a functional manner.

The system controls the motions of the legs and arms in a coordinate manner and outputs displacement commands to respective actuator drivers 88. As illustrated, the system includes a desired working pattern generator, an object reaction force equilibrium controller, a main leg controller and a main arm controller.

Figure 4:
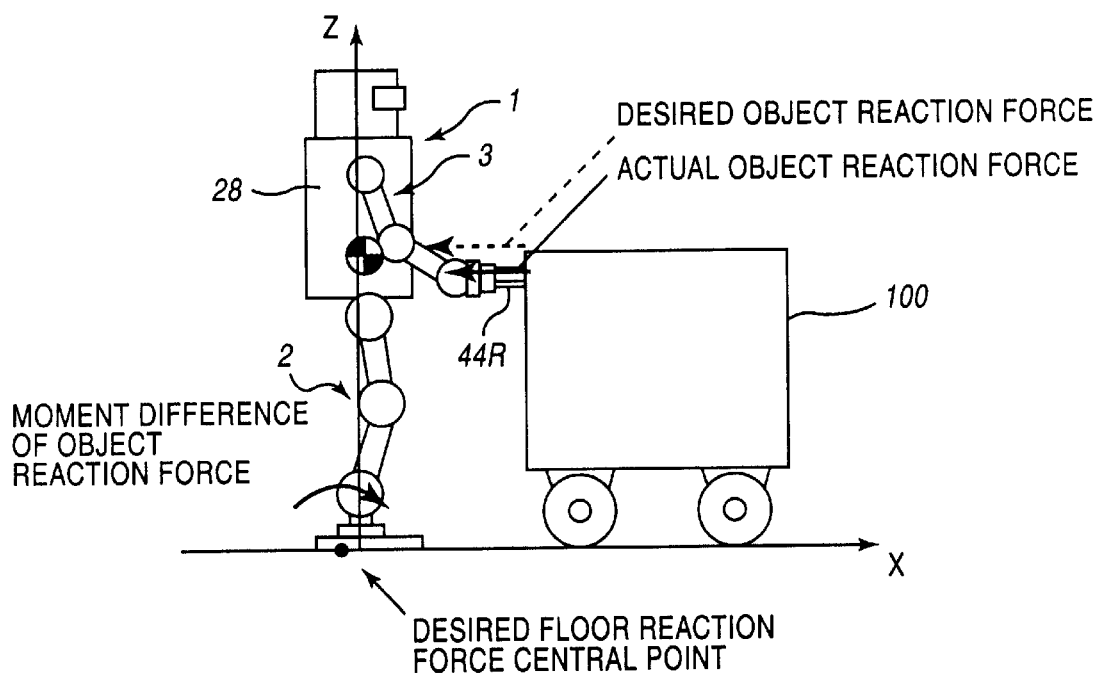
FIG. 4 is an explanatory view showing a working operation conducted by the robot illustrated in FIG. 1 using arms.

For ease of understanding, the processing or operation of these components will be explained below, taking the working illustrated in FIG. 4. In the example illustrated in FIG. 4, it is supposed that, when the robot 1 is pushing a truck 100, the absolute value of the object reaction force acting on the robot 1 from the truck, falls abruptly below an anticipated object reaction force in a desired working pattern such that the robot 1 loses balance due to difference and is about to decline forward. The system according to this embodiment is configured to control the robot to keep dynamic balance or equilibrium even under such a condition.

The desired working pattern generator generates the desired working pattern which satisfies the dynamic equilibrium condition at an anticipated condition. The desired working pattern is described by time variant patterns in a plurality of variables. The variables comprise those describing motions and the reaction forces acting from the working environment.

The variables describing motions are a combination of variables which solely determines robot posture at every instant. Specifically, they comprise desired feet position/posture (position and/or posture), desired body position/posture (position and/or posture), and desired hand position/posture (position and posture).

The variables describing the reaction force acting from the working environment comprise desired total floor reaction force central point (the position of the central point of a desired total floor reaction force, i.e., desired ZMP, (Zero Moment Point), more precisely desired ZMP position), desired total floor reaction force and the desired object reaction force.

Figure 5:
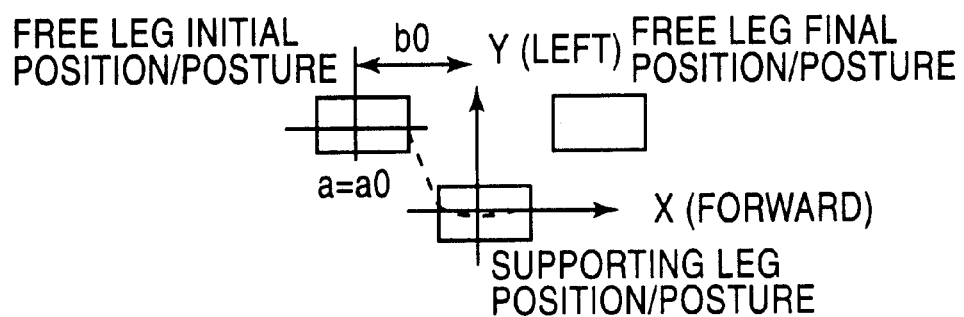
FIG. 5 is an explanatory view showing the coordinate system set with respect to the supporting leg in a gait generated by a desired working pattern generator illustrated in FIG. 3.
Figure 6:
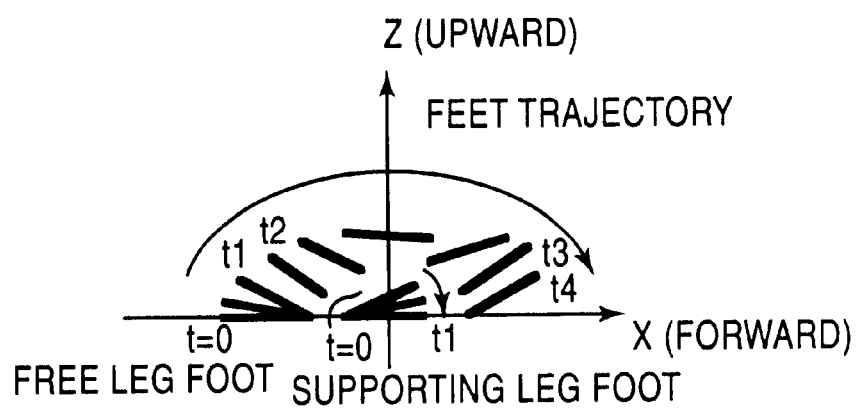
FIG. 6 is an explanatory view further showing the coordinate system set with respect to the supporting leg in the gait generated by the desired working pattern generator illustrated in FIG. 3.

These variables are expressed by the supporting leg coordinate system. The supporting leg coordinate system is a coordinate system whose origin is set at a point on the sole of foot 22R(L) of supporting leg, corresponding to that projected vertically down from the ankle (the intersection of the joints 18, 20R(L)). More specifically, as illustrated in FIGS. 5 and 6, the coordinate system is fixed on the floor with which the supporting leg foot sole is in contact. In the coordinate system, the forward direction of the supporting leg foot is defined as the direction of X-axis, the left direction is defined as the direction of Y-axis and the vertical upward direction is the direction of Z-axis.

The variables will be explained in detail as follows.

As mentioned before, among the external forces acting on the robot in the environment, the external force other than the respective foot floor reaction forces (acting on the robot through the respective feet) is called the object reaction force. The desired object reaction force is a desired value thereof. In the example illustrated in FIG. 4, the object reaction force is the reaction force which acts on the robot through the respective hands 44R(L) from the object 100.

The desired working pattern generator generates the desired object reaction force which is expressed by force and moment acting about the desired total floor reaction force central point (the central point of the desired total floor reaction force). Of the components of force and moment, what is significant for the posture stabilization is the moment component.

Explaining the desired total floor reaction force and the desired total floor reaction force central point (position), the anticipated resultant force of the desired floor reaction forces to be acting on the respective feet from the floor during working is called the desired total floor reaction force in a broad sense. The desired total floor reaction force in a broad sense is expressed by the desired total floor reaction force central point and the force and moment acting about the central point. The desired total floor reaction force central point is a floor point at which the moment component about the X-axis and the moment component about the Y-axis are both zero, when the total floor reaction force is defined by the force and moment whose point of action is that floor point.

The desired total floor reaction force in a narrow sense indicates the components of force and moment of the desired total floor reaction force in the broad sense. The desired total floor reaction force generated by the desired working pattern generator indicates the desired total floor reaction force in the narrow sense.

In the following, the desired total floor reaction force indicates, if not explained to the contrary, that in the narrow sense. When the robot is anticipated to walk on a flat floor, the point of action of the desired total floor reaction force is, normally, set on the floor.

The concept of the ZMP (Zero Moment Point), known hitherto in the field of robot locomotion control, is used in this specification in an expanded meaning. To be more specific, a floor point at which the moment components about the X-axis and Y-axis of the resultant force (of the inertial force, the gravity and the object reaction force generated by the robot motion) are both zero is called the ZMP, when expressing the resultant force (of the inertial force, the gravity and the object reaction force generated by the robot motion) by the force and moment, using this floor point as the point of action. The ZMP in the desired robot motion is the desired ZMP (more precisely the desired position of ZMP).

To say that the desired working pattern satisfies the dynamic equilibrium condition indicates that the aforesaid resultant force of the inertial force, the gravity and the object reaction force generated by the desired robot motion and the desired total floor reaction force cancel with each other to be zero. In order to satisfy the dynamic equilibrium condition, accordingly, the desired total floor reaction force central point and the desired ZMP should be the same.

The desired working pattern generator generates the desired working pattern which satisfies the dynamic equilibrium condition. Accordingly, the desired total floor reaction force central point in the pattern is equal to the desired ZMP (position).

The desired feet position/posture, the desired body position/posture and the desired hand position/posture indicate corresponding positions and postures expressed in the aforesaid supporting leg coordinate system. The position and its (displacement) velocity of the body 28 indicates a representative point such as the center of gravity of the body 28 and the (displacement) velocity of the point. Moreover, the postures of the body and feet indicates the orientation or direction of the body and feet in the absolute space of X, Y, Z.

The object reaction force equilibrium controller and its operation or control are the nucleus of the posture control in this embodiment. The object reaction force equilibrium controller conducts control so as to keep posture in balance taking the dynamic equilibrium condition into account. Before entering into the explanation of the object reaction force equilibrium controller, the dynamic equilibrium condition itself will be explained in the following.

The most important factor from among factors which determines the robot behavior in posture inclination, is the balance or equilibrium of the actual moment of force about the desired total floor reaction force central point (i.e., the desired ZMP).

The moments of force acting about the desired total floor reaction force central point are as follows.

1) the moment of inertial force 2) the moment of gravity
3) the moment of total floor reaction force
4) the moment of object reaction force These moments will be defined in the following.

The moment of inertial force is a moment generated by the change in angular momentum of the robot about the desired floor reaction force central point. The moment is calculated using Eulerian equation. More specifically, the moment is obtained by calculating the first differential of angular momentum of the robot about the desired total floor reaction force central point and then by inverting the sign of the calculated value.

The moment of inertial force of the desired working pattern is called the desired moment of inertial force. The moment of inertial force actually generated during robot working is called the actual moment of inertial force.

The moment of gravity is the moment generated by the gravity (acting on the center of gravity of the robot) acting about the desired total floor reaction force central point.

The resultant force of the floor reaction forces each acting on the respective feet is defined as the total floor reaction force. The moment of total floor reaction force is the moment generated by the total floor reaction force acting about the desired total floor reaction force central point.

The reaction force acting on the robot from the object is the object reaction force. The moment of the object reaction force is the moment generated by the object reaction force acing about the desired floor reaction force central point.

Here, assuming that the robot 1 follows faithfully a motion pattern of the desired working pattern with the aid of an ideal main leg controller, the actual moment of inertial force will be equal to the desired moment of inertial force and the actual moment of gravity will be equal to the desired moment of gravity.

On the other hand, according to the law of dynamics (i.e., Eulerian equation), the sum of the actual moment of inertial force, the actual moment of gravity, the actual moment of total floor reaction force and the actual moment of object reaction force is always zero.

Therefore, in order that the robot 1 follows faithfully the motion pattern of the desired working pattern, the sum of the actual moment of inertial force, the actual moment of gravity, the desired moment of total floor reaction force and the desired moment of object reaction force must be zero. This is called Condition 1.

In fact, however, the actual moment of object reaction force is not equal to the desired moment of object reaction force, producing a difference or error therebetween. This will be the case, that explained with reference to FIG. 4 in which during truck pushing, for example, the absolute value of the actual rolling frictional force of the truck (the object) falls suddenly below the anticipated value.

In such a situation, the moment generated by the actual object reaction force acting about the Y-axis of the desired total floor reaction force central point, exceeds the moment generated by the desired object reaction force acting about the Y-axis of the desired total floor reaction force central point in the positive direction, thereby failing to satisfy Condition 1 and cause the robot 1 to tilt forward. It should be noted that the direction of moment is defined in such a manner that the moment which moves the robot 1 clockwise in the positive direction on the coordinate axis, is positive.

In order to satisfy Condition 1 even under such a situation, there are perceivably two methods.

Method 1) to vary the actual moment of total floor reaction force so as to cancel the aforesaid difference or error. Specifically, the main leg controller is instructed such that it generates a negative moment of floor reaction force about the desired total floor reaction force central point. The main leg controller drives, in response to the instruction, the toes of the feet 22R(L) downward to increase the actual moment of floor reaction force in the negative direction, in other words, control the robot to take a posture to brace legs.

Method 2) to correct the desired moment of inertial force and the desired moment of gravity by correcting the motion pattern of the desired working pattern so as to cancel the aforesaid difference or error. Specifically, the desired moment of inertial force and the desired moment of gravity are corrected by correcting the desired body position/posture. More specifically, the body is controlled to move forward.

In the system according to this embodiment, both of the two methods are used simultaneously. Specifically, method 1) is mainly used in a short term so as to cope with a rapid change, while method 2) is mainly used in a long term so as to make the actual moment of total floor reaction force to converge the original desired moment of total floor reaction force, such that the robot reserves dynamic balance all the time.

Since the actual moment of total floor reaction force can be varied quickly through the main leg controller by only changing the desired moment of total floor reaction force, method 1) is suitable for quick response. However, if the actual moment of total floor reaction force is varied greatly, the contact-pressure distribution on the soles of feet 22R(L) will be partial and degrades the contactability with the floor. With this, at the worst, a portion of the feet 22R(L) will be lifted. Therefore, in the long term, the desired moment of total floor reaction force should preferably be returned to its original value.

In order to return the desired moment of total floor reaction force to its original value, it suffices if the motion pattern of the desired working pattern is corrected using method 2) such that the position of center of gravity is displaced to cancel the aforesaid difference or error by the desired moment of gravity. The position of center of gravity should preferably be displaced gradually, since, if the position of center of gravity is displaced sharply, that would generate an excessive desired moment of inertial force in the opposite direction. Thus, method 2) is suitable in coping with the situation taking a long time.

Based on the above, the object reaction force equilibrium controller will be explained. The object reaction force equilibrium controller is the system which has the function to conduct the control mentioned above.

The inputs to the object reaction force equilibrium controller are the desired body position/posture, the desired total floor reaction force central point (the position of the central point of the desired total floor reaction force), the desired object reaction force, the output of the force sensor 58, a final corrected desired hand position/posture, a final corrected desired body position/posture and a final corrected desired feet position/posture. (If approximation is used, the final corrected desired hand position/posture, the final corrected desired body position/posture and the final corrected desired feet position/posture are unnecessary, as will be explained later.)

In order to effect the control mentioned above, the object reaction force equilibrium controller replaces the desired object reaction force with the actual object reaction force (detected value), and corrects the desired body position/posture and the desired total floor reaction force such that the dynamic balance or equilibrium is achieved. With this, the object reaction force anticipated in the corrected working pattern, (i.e., the corrected desired object reaction force) becomes equal to the actual object reaction force, and accordingly, the dynamic equilibrium condition of the robot is satisfied.

The outputs from the object reaction force equilibrium controller are the corrected desired body position/posture and a compensating total floor reaction force for object reaction force equilibrium control.

The corrected desired body position/posture is a desired body position/posture corrected by the object reaction force equilibrium controller. The compensating total floor reaction force for object reaction force equilibrium control is a total floor reaction force to be added to the desired total floor reaction force central point (position) by correction. Among the components of the compensating total floor reaction force for object reaction force equilibrium control, the significant components for posture stabilization are, in particular, the moment component about the X-axis and the moment component about the Y-axis.

Here, explaining the object reaction force equilibrium controller with respect to the behavior of its outputs, if the difference or error between the actual object reaction force and the desired object reaction force, more precisely the difference or error in moment therebetween, changes sharply, and specifically if it changes in a step-like manner as illustrated in FIG. 7, the moment components of the compensating total floor reaction force for object reaction force equilibrium control will respond quickly in response to the difference or error so as to satisfy the dynamic equilibrium condition.

After a certain time has passed, the corrected desired body position/posture settles to the position and posture at which the balance is statically canceled, and the moment components of the compensating total floor reaction force for object reaction force equilibrium control converges to zero. The configuration as well as the algorithm of the object reaction force equilibrium controller will be explained later.

In FIG. 3, the desired values inputted to the main leg controller are the corrected desired body position/posture, desired feet position/posture, the desired total floor reaction force central point (position), and the desired total floor reaction force and the compensating total floor reaction force for object equilibrium control acting on this desired total floor reaction force central point.

The main leg controller is, briefly speaking, a controller which manipulates or drives the leg actuators (electric motors and encoders for the joint IOR(L), etc.), and simultaneously conducts the posture stabilization control to follow the desired posture and the floor reaction force control to follow the desired floor reaction force. Since, however, it is impossible to completely satisfy both the desired posture and the desired floor reaction force at the same time, the control is arranged such that both are eventually effected over a long time.

More specifically, the controller calculates a restoring total floor reaction force to be generated about the desired total floor reaction force central point such that the actual body position/posture detected by the inclination sensor 60 is restored or corrected to the corrected desired body position/posture, and corrects the desired feet position/posture so as to rotate or move the feet 22R(L) upward or downward such that the moment components of the actual total floor reaction force acting about the desired total floor reaction force central point are equal to the moment components of the resultant force of the restoring total floor reaction force, the desired total floor reaction force and the compensating total floor reaction force for object reaction force equilibrium control. The corrected desired feet position and posture is called the final corrected desired feet position and posture.

Thus, the controller corrects the desired feet position/posture such that the moment components of the actual total floor reaction force acting about the desired total floor reaction force central point are equal to the moment components of the resultant of the desired total floor reaction force and the compensating total floor reaction force for object reaction force equilibrium control, if the actual body position/posture as well as the change rate thereof detected by the inclination sensor 60 are equal to the corrected desired body position/posture and the change rate thereof.

Further, the main leg controller controls the leg actuators such that actual joint displacements follow desired joint displacements determined by the corrected desired body position/posture and the corrected desired feet position/posture.

The main leg control system comprises the main leg controller, the inclination sensor 60, the force sensor 56, the actuator drivers 88 and the actuators (i.e., electric motors and encoders provided in the joints 10R(L) to 20R(L)).

The desired feet position/posture corrected by the main leg controller are inputted, as the final corrected desired feet position/posture, to the object reaction force equilibrium controller. It should be noted, however, that, when the positional change of the center of gravity of the robot due to the desired feet position/posture correction is negligible in the object reaction force equilibrium controller, it is unnecessary to input the final corrected desired feet position/posture to the object reaction force equilibrium controller.

In FIG. 3, the desired values inputted to the main arm controller are the corrected desired body position/posture, the desired hand position/posture and the desired object reaction force.

Simply briefing the function of the main arm controller, it manipulates the arm actuators (the electric motors and encoders provided at the joints 30R(L), etc.) and simultaneously conducts the posture control to follow desired posture and object reaction force equilibrium control to follow the desired object reaction force. Since, it is impossible to completely satisfy both the desired posture and desired object reaction force, it uses an appropriate known technique as the manipulator compliance control, such as the so-called "virtual compliance control" (JSME Mechanical Engineer's Handbook; Engineering, C4, page 100).

Explaining the configuration and the algorithm of the main arm control system more specifically, it comprises the main arm controller, the force sensor 58 provided at the hands 44R(L), the actuator drivers 88 and the actuators (i.e., electric motors and encoders provided in the joints 30R(L) to 42R(L)).

The main arm controller corrects the desired hand position/posture in response to the deviation or error between the actual object reaction force detected by the force sensor 58 and the desired object reaction force. The corrected desired hand position/posture is called the final corrected desired hand position/posture. The main arm controller controls the arm actuators such that actual joint displacements follow desired joint displacements determined by the corrected desired body position/posture and the final corrected desired hand position/posture.

The object reaction force equilibrium controller will further be explained.

Figure 8:
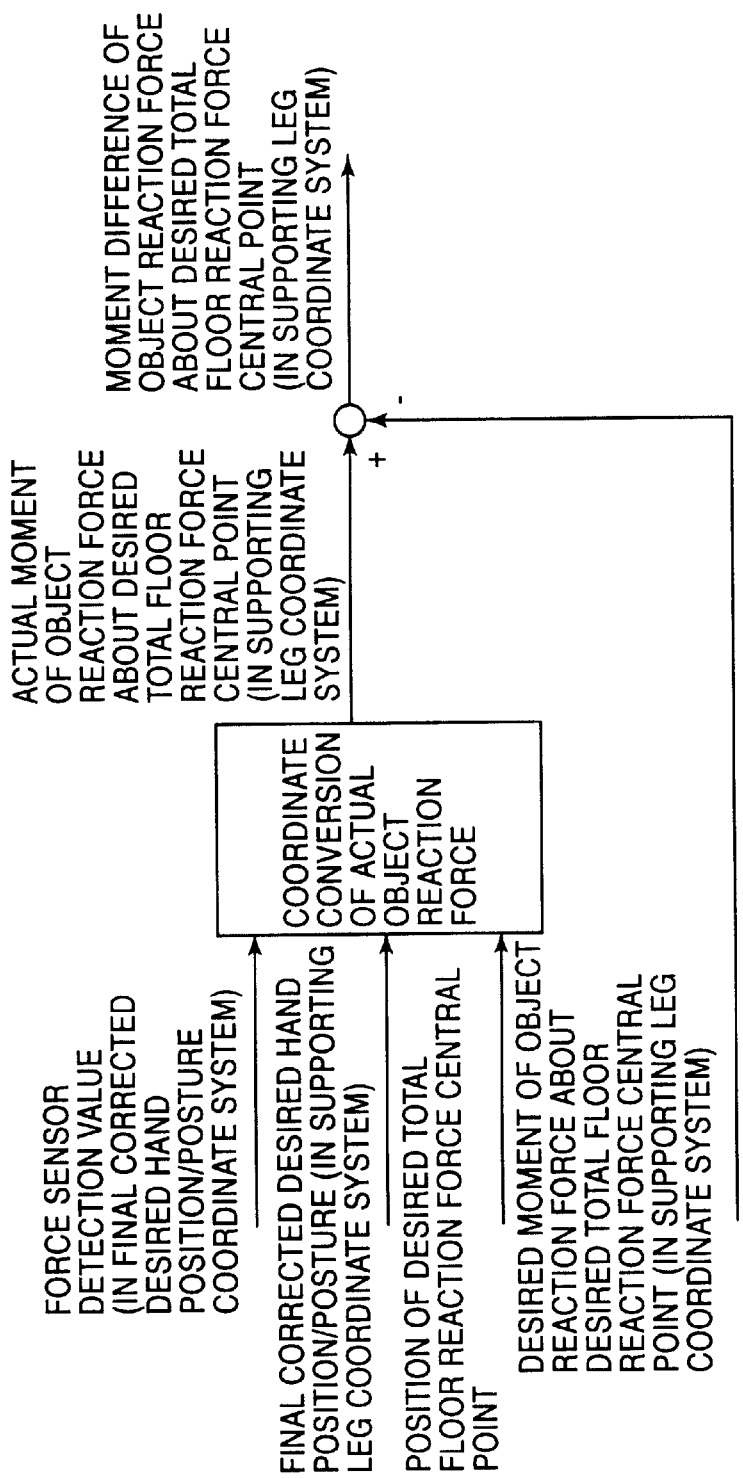
FIG. 8 is a block diagram showing in detail a first half of the configuration of the object reaction force equilibrium controller illustrated in FIG. 3.
Figure 9:
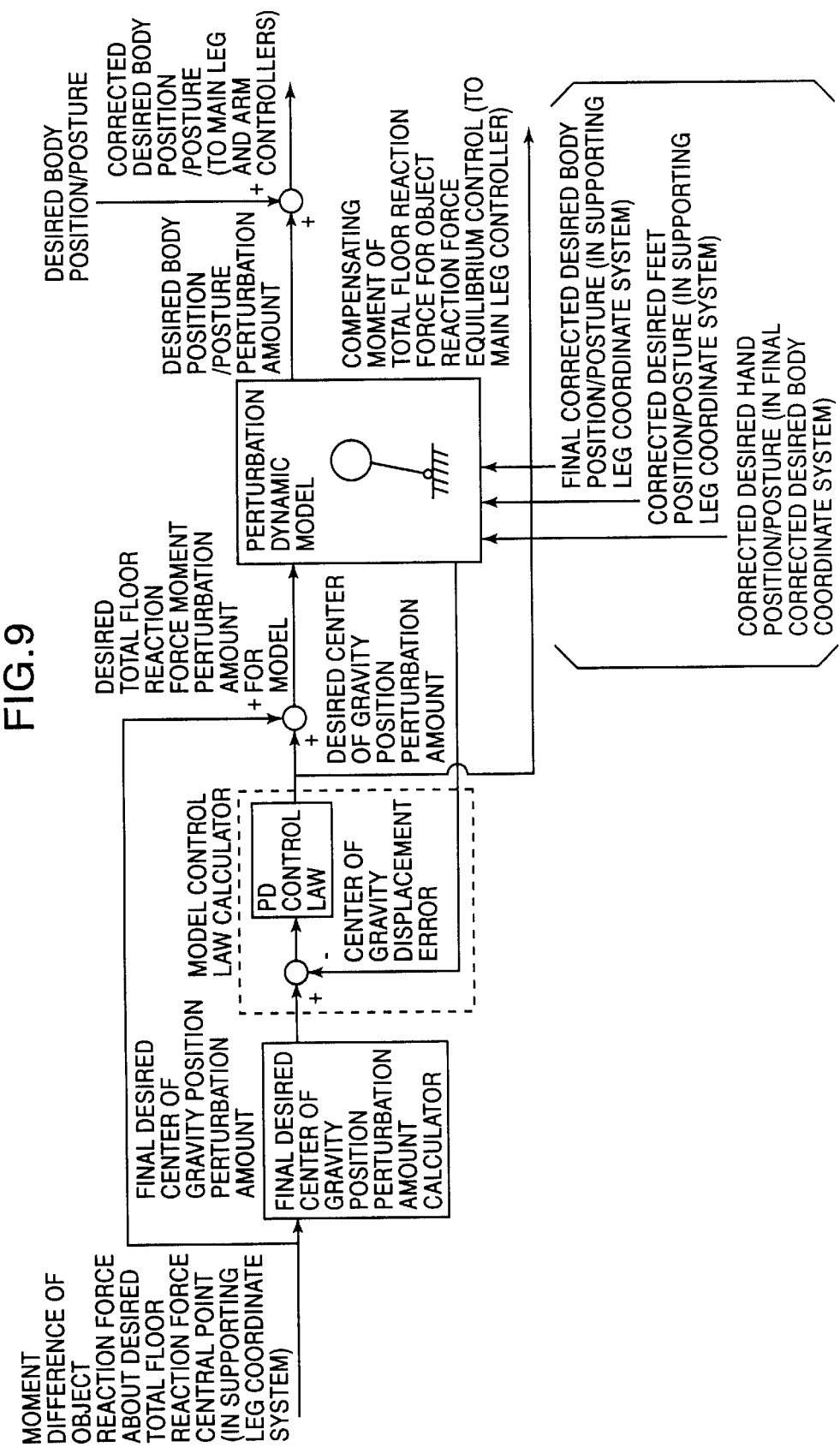
FIG. 9 is a block diagram showing in detail the last half of the configuration of the object reaction force equilibrium controller illustrated in FIG. 3.

FIG. 8 is a block diagram showing a first half of the control procedures of the object reaction force equilibrium controller and FIG. 9 is a block diagram showing the last half of the control procedures of the object reaction force equilibrium controller.

The procedures of the first half will be explained with reference to FIG. 8.

Since the hands 44R(L) are expected to be controlled almost at the final corrected desired hand position/posture by the main arm controller, the actual object reaction force detected by the force sensor 58 is converted into the moment and force about the origin of the supporting leg coordinate system based on the corrected desired hand position/posture. (This may be done by estimating the actual hand position/posture from the actual joint displacements using the kinematic solution and then by converting the actual object reaction force using the estimated value.)

Then, the converted actual object reaction force is converted into the force and moment about the desired total floor reaction force central point to determine the actual moment of the object reaction force about the desired total floor reaction force central point. Then, the desired moment of the object reaction force is subtracted from the determined moment to determine the moment difference or error of object reaction force about the desired total floor reaction force central point.

The last half procedures of the object reaction force equilibrium controller will next be explained with reference to FIG. 9.

First, explanation will be made on a perturbation dynamic model used there.

Figure 10:
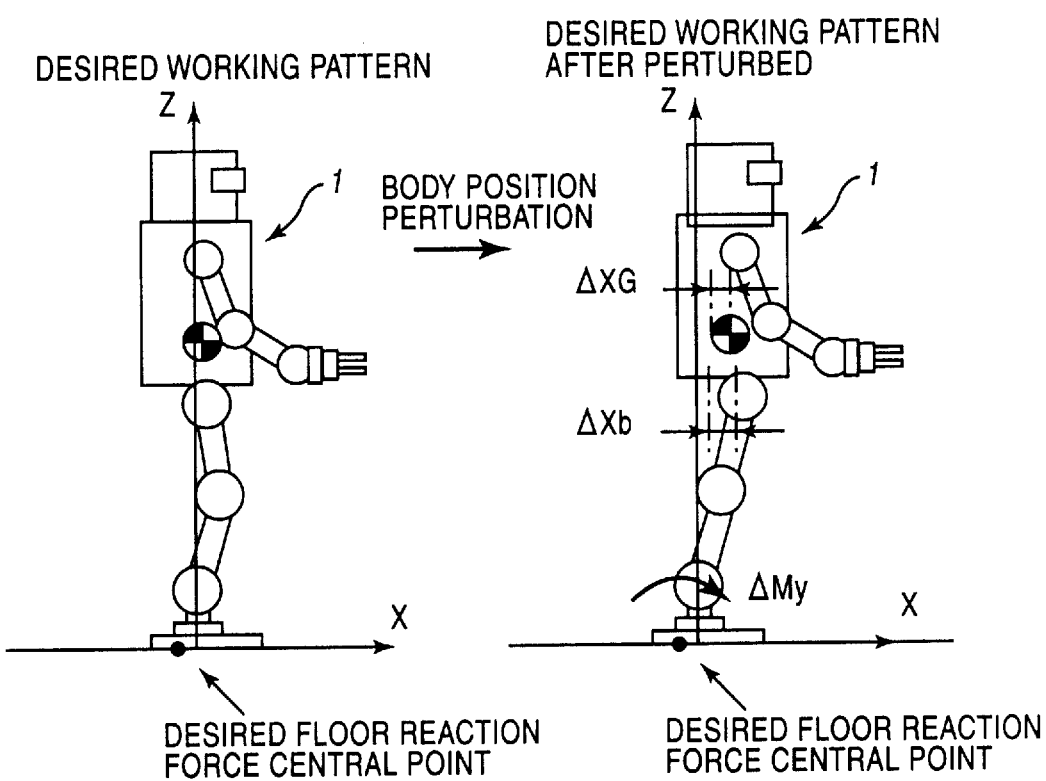
FIG. 10 is an explanatory view showing a perturbation dynamic model of the object reaction force equilibrium controller illustrated in FIG. 9.

The perturbation dynamic model is a model which indicates or describes the relationship between a perturbation amount of the desired moment of total floor reaction force and a perturbation amount of the desired body position/posture under the situation in which the motion (perturbation) of the desired working pattern is given by a certain condition of constraint. The model will be explained on the assumption that, for example, only the horizontal body position among all of the body positions is perturbed, while the robot body posture is made equal to the desired value, as illustrated in FIG. 10.

Here, the symbols are defined as follows.

m: total robot mass g: acceleration of gravity h: height of the center of gravity of the robot from the desired total floor reaction force central point $\Delta xG$: X component of a perturbation amount of desired position of center of gravity $\Delta yG$: Y component of a perturbation amount of desired position of center of gravity $\Delta xb$: X component of a perturbation amount of desired body position $\Delta yb$: Y component of a perturbation amount of desired body position $\Delta Mx$: X component of a perturbation amount of desired moment of total floor reaction force about the desired total floor reaction force central point $\Delta My$: Y component of a perturbation amount of desired moment of total floor reaction force about the desired total floor reaction force central point $\Delta MGx$: X component of a perturbation amount of desired moment of gravity about the desired total floor reaction force central point $\Delta MGy$: Y component of a perturbation amount of desired moment of gravity about the desired total floor reaction force central point $\Delta Lx$: X component of a perturbation amount of desired angular momentum about the desired total floor reaction force central point $\Delta Ly$: Y component of a perturbation amount of desired angular momentum about the desired total floor reaction force central point d(a)/dt: time differential of variable a d(d(a)/dt)/dt: 2nd time differential of variable a The definition of the moment of gravity yields the following equation.

$$\Delta MGx = -\Delta yG * mg$$

$$\Delta MGy = \Delta xG * mg \qquad \text{Eq. 1}$$

If the equivalent moment of inertia about the center of gravity for the robot motion or perturbation is sufficiently small and negligible, the following equation can be obtained.

$$\Delta Lx = -mh * d(\Delta yG)/dt$$

$$\Delta Ly = mh * d(\Delta xG)/dt \qquad \text{Eq. 2}$$

From Eulerian equation, the following equation can be obtained.

$$d(\Delta x)/dt = \Delta MGx + \Delta Mx$$

$$d(\Delta Ly)/dt = \Delta MGy + \Delta My \qquad \text{Eq. 3}$$

From Eqs. 1, 2 and 3, the following equation will be obtained as the motion of equation of the perturbation dynamic model.

$$mh * d(d(\Delta xG)/dt)/dt = \Delta xG * mg + \Delta My$$

$$mh * d(d(\Delta yG)/dt)/dt = \Delta yG * mg - \Delta Mx \qquad \text{Eq. 4}$$

It is perceived that the perturbation amount of the desired center of gravity position and that of the desired body position is almost in a proportional relationship. Accordingly, if defining the proportional coefficient as k, the perturbation amount of desired body position will be determined by the following equation.

$$\Delta xb = k * \Delta xG$$

$$\Delta yb = k * \Delta yG \qquad \text{Eq. 5}$$

Figure 11:
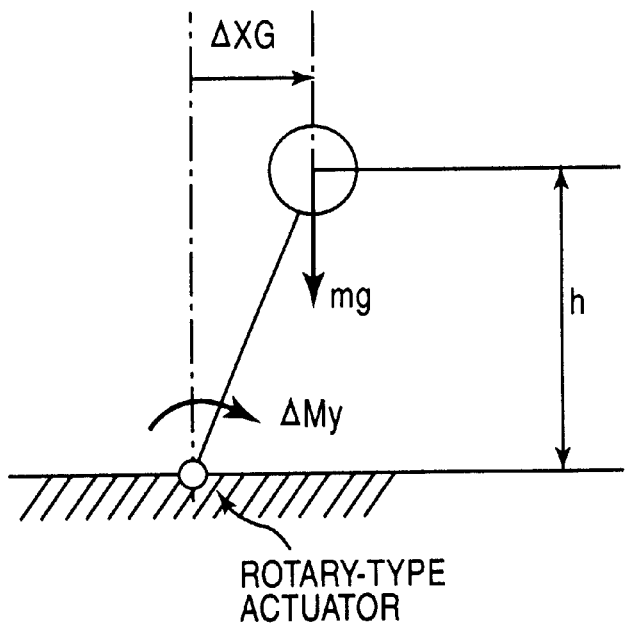
FIG. 11 is an explanatory view explaining the model illustrated in FIG. 10 approximated by an inverted pendulum.

The perturbation dynamic model is used to calculate or determine the perturbation amount of desired center of gravity position and the perturbation of desired body position based on Eqs. 4 and 5. More precisely, since the system uses digital calculations, Eq. 4 is discretized and is used. It is noteworthy that Eq. 4 is equal to the equation of behavior of an inverted pendulum, illustrated in FIG. 11, having the height h and the mass m.

As illustrated in the last half of the object reaction force equilibrium controller shown in FIG. 9, the aforesaid moment difference or error of object reaction force about the desired total floor reaction force central point is inputted to a final desired center of gravity position perturbation amount calculator.

The perturbation amount of center of gravity for canceling, in a long term, the moment difference or error of object reaction force about the desired total floor reaction force central point so as to keep balance, is called the perturbation amount of final desired center of gravity position. Thus, the final desired center of gravity position perturbation amount calculator calculates the perturbation amount of final desired center of gravity position based on the moment difference or error.

Here, the symbols are defined as follows.

$\Delta Mox$: X component of moment difference or error of object reaction force $\Delta Moy$: Y component of moment difference or error of object reaction force $\Delta MGox$: X component of moment of gravity generated by the perturbation amount of final desired center of gravity position $\Delta MGoy$: Y component of moment of gravity generated by the perturbation amount of final desired center of gravity position $\Delta xGe$: X component of the perturbation amount of final desired center of gravity position $\Delta yGe$: Y component of the perturbation amount of final desired center of gravity position.

In order to cancel the moment difference or error of the object reaction force by the moment of gravity generated by the perturbation amount of final desired center of gravity position, the following equation must be satisfied.

$$\Delta MGox = -\Delta Mox$$

$$\Delta MGoy = -\Delta Moy \qquad \text{Eq. 6}$$

The moment of gravity generated by the perturbation amount of final desired center of gravity position can be expressed by the following equation.

$$\Delta MGox = -mg*\Delta yGe$$

$$\Delta MGoy = mg*\Delta xGe \qquad \text{Eq. 7}$$

Eqs. 6 and 7 lead to the following equation.

$$\Delta xGe = -\Delta Moy/mg$$

$$\Delta yGe = \Delta Mox/mg \qquad \text{Eq. 8}$$

Thus, the perturbation amount of final desired center of gravity position can be calculated or determined using Eq. 8.

Explaining a model control law calculator in the object reaction force equilibrium controller, when the difference or error between the perturbation amount of final desired center of gravity position and the perturbation amount of desired center of gravity position determined through the perturbation dynamic model is called a difference or error of center of gravity displacement, the model control law calculator controls such that the difference or error of center of gravity displacement converges to zero. The output of the calculator is the compensating moment of total floor reaction force for object reaction force equilibrium control.

Specifically, the compensating moment of total floor reaction force for object reaction force equilibrium control may be determined using a PD (Proportional-Differential) control law shown, for example, as follows.

Compensating moment of total floor reaction force for object reaction force equilibrium control=$Kp$*Difference of center of gravity displacement+$Kd$*Differential value of difference of center of gravity displacement $\qquad$ Eq. 10

In the above, Kp is a proportional gain and Kd is a differential gain.

Explaining an adder immediately downstream the output of the model control law calculator, by the adder the perturbation dynamic model is inputted with the sum of the compensating moment of total floor reaction force for object reaction force equilibrium control and the moment difference or error of object reaction force about the desired total floor reaction force central point, as a perturbation amount of desired moment of total floor reaction force for model (model input amount), and a perturbation amount of desired body position/posture corresponding to the input, is calculated. The calculated value is added to the desired body position/posture to determine or generate the corrected desired body position/posture.

Since the perturbation dynamic model satisfies the dynamic equilibrium condition, the sum of the perturbation amount of desired moment of inertial force and the perturbation amount of desired moment of gravity (generated by the perturbation amount of the desired body position/posture which is the output of the model) and the model input, is zero.

This leads to the following equation.

Perturbation amount of desired moment of inertial force+Perturbation amount of desired moment of gravity+Compensating moment of total floor reaction force for object reaction force equilibrium control+Moment difference of object reaction force=0 $\qquad$ Eq. 11

On the other hand, the main leg controller is instructed to additionally generate the compensating moment of total floor reaction force for object reaction force equilibrium control about the desired total floor reaction force central point. In other words, the control is conducted such that the compensating moment of total floor reaction force for object reaction force equilibrium control is added, as the perturbation amount of actual moment of total floor reaction force, to the actual moment of total floor reaction force. The actual moment of total floor reaction force resulting in therefrom is named as the corrected actual moment of total floor reaction force.

Accordingly, the above leads to the following equation.

Perturbation amount of actual moment of total floor reaction force=Compensating moment of total floor reaction force for object reaction force equilibrium control $\qquad$ Eq. 12

Eqs. 11 and 12 lead to the following equation.

Perturbation amount of desired moment of inertial force+Perturbation amount of desired moment of gravity+Perturbation amount of actual moment of total floor reaction force+Moment difference of object reaction force=0 $\qquad$ Eq. 13

The fact that the desired working pattern satisfies the dynamic equilibrium condition satisfies the following equation, if the robot works under an ideal condition.

Desired moment of inertial force+Desired moment of gravity+Actual moment of total floor reaction force−Desired moment of object reaction force=0 $\qquad$ Eq. 14

Based on the fact that the respective corrected moments are the addition of the original moments and the moment perturbation amounts, and that actual moment of object reaction force is the sum of the desired moment of object reaction force and the moment difference or error of object reaction force, the following identity is obtained in accordance with Eqs. 13 and 14.

Corrected desired moment of inertial force+Corrected desired moment of gravity+Corrected actual moment of total floor reaction force+Actual moment of object reaction force=0

Eq. 15

Eq. 15 indicates that the desired moment of inertial force, the desired moment of gravity and the actual moment of total floor reaction force are corrected by the object reaction force equilibrium control, no matter how the actual moment of object reaction force deviates from the desired moment of object reaction force, and that Eq. 1 is always satisfied.

Saying the same thing using Eq. 13, the perturbation amount of desired inertial force, the perturbation amount of desired gravity and the perturbation amount of actual total floor reaction force are generated by the object reaction force equilibrium control, even if the moment difference or error of object reaction force exists, such that the moment difference or error of object floor reaction force is canceled so as to satisfy Eq. 1.

The behavior of the object reaction force equilibrium control in the work of truck pushing illustrated in FIG. 4 will be explained referring again to FIG. 7.

Again assuming the condition is that the absolute value of the rolling frictional force drops suddenly below the anticipated value and decreases in a step-like manner, also the moment difference or error of object reaction force changes in a similar step-like manner as illustrated.

In response thereto, however, the control is configured such that the perturbation amount of final desired center of gravity position is calculated by the final desired center of gravity perturbation amount calculator, and it is configured such that the compensating amount of total floor reaction force for object reaction force equilibrium control is calculated by the model control law calculator in response to the difference or error between the perturbation amount of final desired center of gravity position and the perturbation amount of desired center of gravity position.

As illustrated in FIG. 7, the compensating moment of total floor reaction force for object reaction force equilibrium control gradually reaches zero, as the perturbation amount of desired center of gravity position gradually reaches the perturbation amount of final desired center of gravity position. The sum of the compensating moment of total floor reaction force for object reaction force equilibrium control and the moment difference or error of object reaction force is inputted to the dynamic perturbation model, and the perturbation amount of desired center of gravity position and the perturbation of desired body position/posture are outputted from the dynamic perturbation model. Since the condition of constraint that the posture of the body should remain unchanged is preset, the perturbation amount of desired position/posture is zero.

As mentioned above, since the perturbation dynamic model satisfies the dynamic equilibrium condition, the total sum obtained by adding the moment inputted to the perturbation dynamic model to the sum of the perturbation amount of desired moment of inertial force and the perturbation amount of desired moment of gravity generated by the perturbation amount of desired body position/posture, is zero.

In other words, the sum of the perturbation amount of desired moment of inertial force, the perturbation of desired moment of gravity, the compensating moment of total floor reaction force for object reaction force equilibrium control and the moment difference or error of object reaction force, is zero. As illustrated in FIG. 7, this relationship is always satisfied. The perturbation amount of desired center of gravity position is controlled to gradually reach the perturbation amount of final desired center of gravity position by the model control law calculator. The perturbation amount of desired center of gravity position changes in proportion to or almost in proportion to the perturbation amount of desired moment of gravity.

The above is the behavior of the object reaction force equilibrium controller. The calculation for the control is executed once every predetermined control cycle. As a result, no matter when the actual moment of object reaction force changes, the dynamic equilibrium is always kept or reserved. In other words, if the moment of object reaction force deviates from the desired value, the posture of the robot 1 is controlled such that at first it takes the posture to lower and brace the toes of the feet 22R(L) so as to change the moment of total floor reaction force, and then gradually moves the body forward to depend on the moment of gravity.

Figure 12:
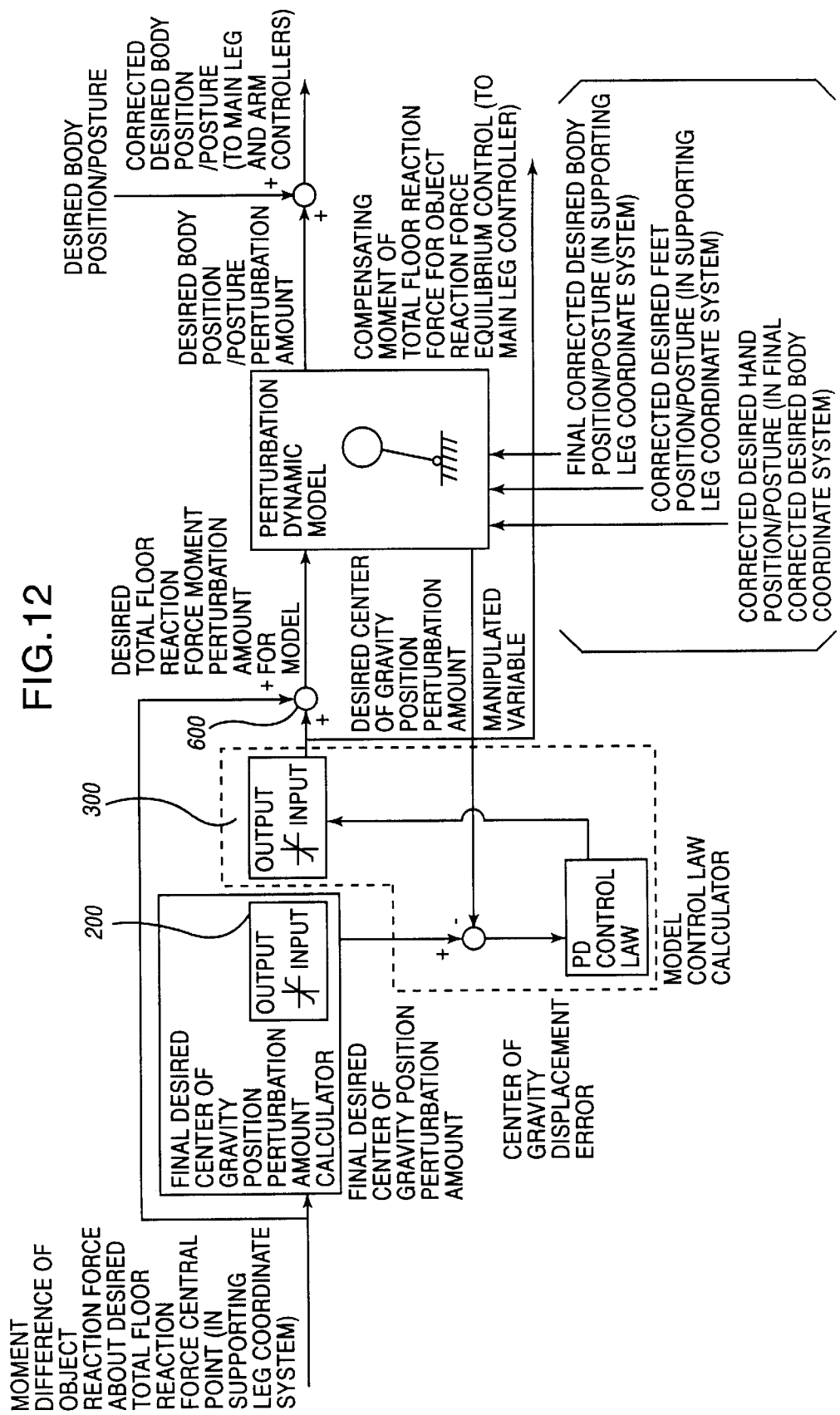
FIG. 12 is a block diagram, similar to FIG. 9, but showing the configuration of the object reaction force equilibrium controller according to a second embodiment of the present invention.

FIG. 12 is a view showing the configuration of a second embodiment of the present invention, in which a limiter 200 is provided which restricts the perturbation of final desired center of gravity position within upper and lower limits.

In the foregoing embodiment mentioned above, if the perturbation amount of final desired center of gravity position is determined to be excessively large, the robot will sometimes not be able to take a corrected desired posture. In order to avoid this, therefore, the system is configured such that a predetermined range of upper and lower limits is set and the perturbation amount of final desired center of gravity position determined in accordance with Eq. 8, is limited within the range. The range or limits may be fixed or variable.

Moreover, the system is configured such that a second limiter 300 is provided in such a manner that the compensating moment of total floor reaction force for object reaction force equilibrium control calculated by the model control law calculator is restricted within a predetermined range of upper and lower limits.

Specifically, the compensating moment of total floor reaction force for object reaction force equilibrium control is generated also at the feet 22R(L) of the robot. Since, however, the moment of total floor reaction force generated at the foot has a permissible range, if the moment exceeds the limit, it degrades the contactability of the feet with the floor, thereby occasionally causing a portion of the feet to be lifted from the floor. In order to avoid this, therefore, the system is configured such that the predetermined range of upper and lower limits is set and the moment of total floor reaction force for object reaction force equilibrium control determined in accordance with Eq. 10, is limited within the range. Similarly to the first limiter 200, the range or limits may be fixed or variable.

Figure 13:
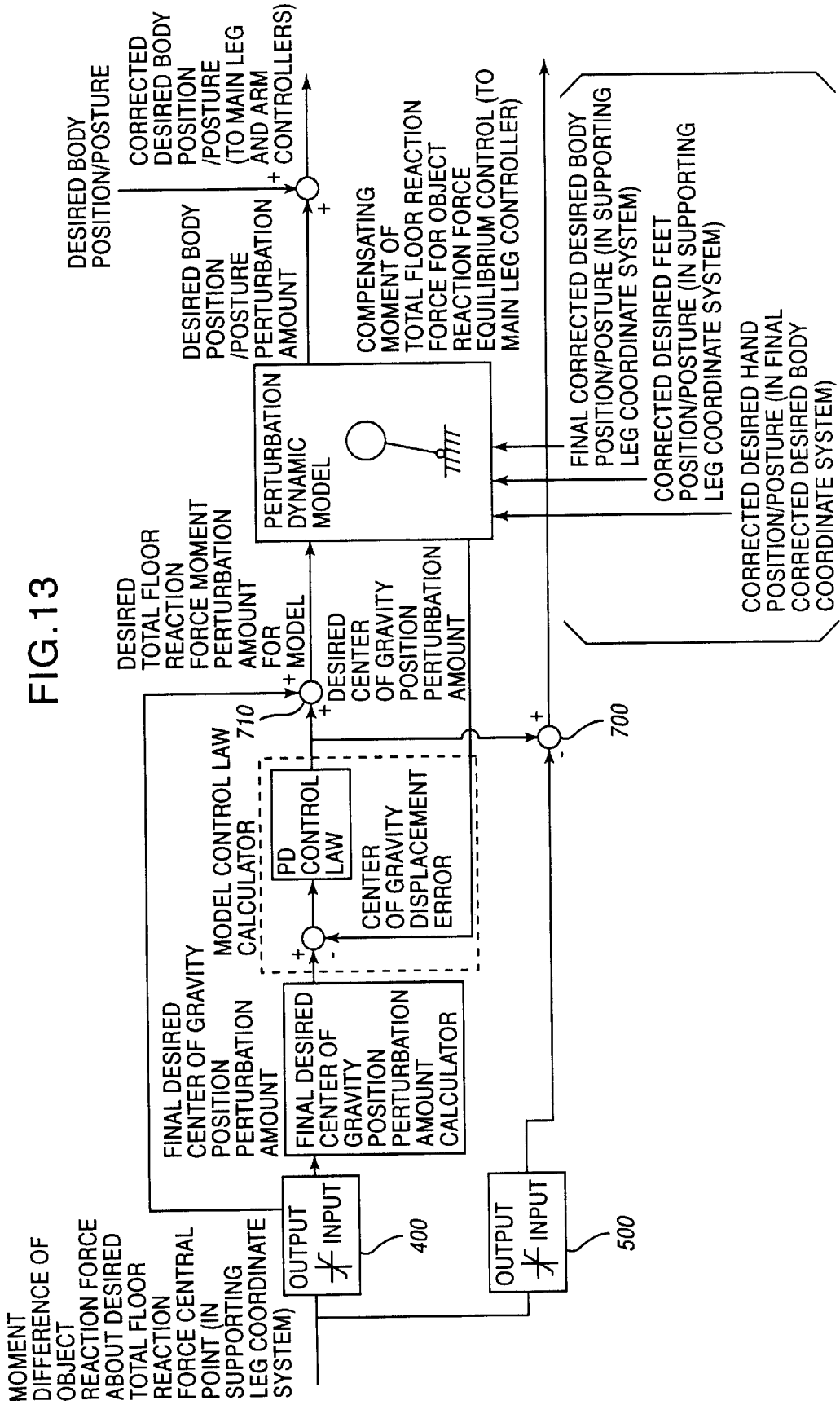
FIG. 13 is a block diagram, similar to FIG. 9, but showing the configuration of the object reaction force equilibrium controller according to a third embodiment of the present invention.

FIG. 13 is a view showing the configuration of a third embodiment of the present invention, in which a limiter 400 is provided which restricts the input to the final desired center of gravity position perturbation amount calculator within a predetermined range of upper and lower limits, and a second limiter 500 is provided such that the compensating moment of total floor reaction force for object reaction force equilibrium control is corrected by a value outside of the range of the first limiter 400.

In the second embodiment illustrated in FIG. 12, in order to prevent the perturbation amount of final desired center of gravity position from becoming excessive, the range of upper and lower limits is predetermined to restrict the perturbation amount of final desired center of gravity position determined according to Eq. 8. However, the value exceeding the range is added to the output of the model control law calculator at an adder 600 (FIG. 12) to be inputted to the model. If the object reaction force becomes excessive, and the limiter operates, the perturbation of the center of gravity position which should counterbalance with the moment difference or error of object reaction force, is disadvantageously switched to move in the opposite direction.

The third embodiment aims to solve this drawback mentioned and is configured such that the input exceeding the range of the first limiter 400 is forwarded to an adder 700 through the second limiter 500 where it is subtracted from the output of the model control law calculator. In other words, the embodiment is configured such that the compensating moment of total floor reaction force for object reaction force equilibrium control is corrected in such a manner that the polarity is inverted to generate the force in a direction opposite to the direction of the force acting to tip over the robot. With this, the robot posture is controlled such that the robot counterbalances with the floor reaction moment generated by the feet 22R(L).

Differing from the second embodiment, the value exceeding the range is not added at an adder 710 (FIG. 13) to the output of the model control law calculator and the added value is not inputted to the model. With this, it can solve the aforesaid disadvantage in that the excessive moment difference or error causes the center of gravity position to perturb in the opposite direction. The rest of the embodiment is not different from the foregoing embodiments. Similar to the foregoing embodiment, the range or limits of the first limiter 400 may be fixed or variable. It is alternatively possible to add a limiter similar to the limiter 300 after the model control law calculator.

Figure 14:
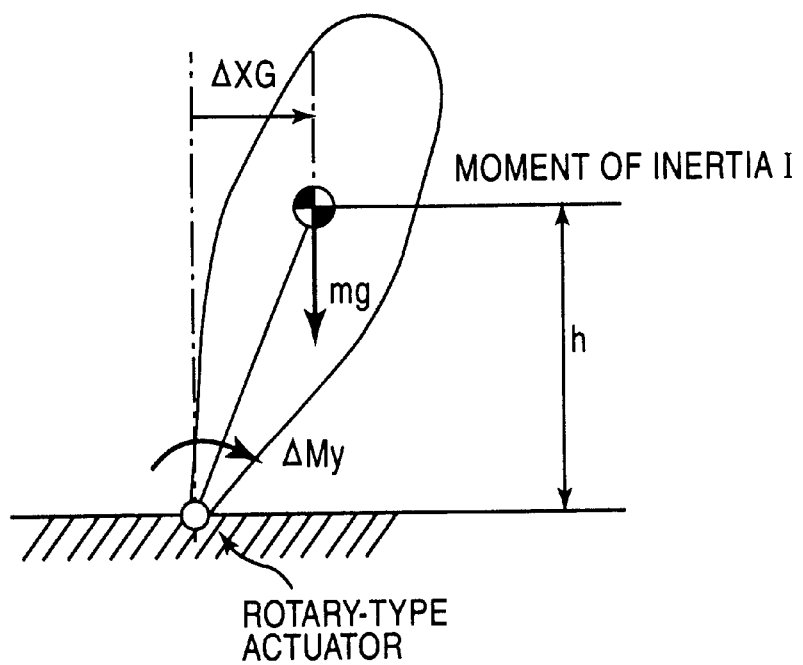
FIG. 14 is a view, similar to FIG. 11, but showing an inverted-pendulum-type perturbation dynamic model to be used in the system according to a fourth embodiment of the present invention.

FIG. 14 is a view showing the configuration of a fourth embodiment of the invention, in which an inverted pendulum additionally describing the moment of inertia I is provided to enhance the accuracy of the perturbation dynamic model in the object reaction force equilibrium controller.

Explaining the perturbation dynamic model again, the height h may be a fixed value if the height of center of gravity changes little. However, if the height of center of gravity changes, depending on the kind of work or task performed, it is alternatively possible to determine the height of center of gravity based on the final corrected desired body position/posture, final corrected desired feet position/posture and the final corrected desired hand position/posture and to vary the height h in response thereto.

In order to determine the relationship between the perturbation amount of center of gravity position and the perturbation amount of body position more accurately, it is alternatively possible to have a multi-link geometric model describing the robot having the leg and arm links, and to obtain the difference or error between the center of gravity position determined from the final corrected desired body position/posture, final corrected desired feet position/posture and the final corrected desired hand position/posture, and the other center of gravity position determined from the body position/posture (obtained by subtracting the perturbation amount of body position from the final corrected desired body position/posture), the final corrected desired feet position/posture and the final corrected desired hand position/posture, such that the perturbation amount of body position is determined from the perturbation amount of center of gravity position using the determined relationship.

Moreover, it is alternatively possible to have a multi-link dynamic model describing the robot having the leg and arm links, which inputs the perturbation amount of desired floor reaction force and outputs the perturbation amount of desired body position/posture and the perturbation amount of center of gravity, provided that the pattern of motion is given with a certain condition of constraint.

Apart from the above, when using a perturbation dynamic model which requires to take into account the influence of the perturbation amount of inertial force and/or that of gravity of the arms when the arms are perturbed from a desired working pattern, the calculation load of the control system becomes large.

To be more specific, the perturbation amount of inertial force and/or gravity of arms is influenced by the perturbation amount of desired body position/posture and vice versa. Accordingly, if the behavior of the model is to be calculated simultaneously taking the interaction therebetween into account, this would require extremely complicated calculation.

In order to solve this problem, the following method may be effective.

In the perturbation dynamic model, the influence by the perturbation amount of inertial force and/or gravity of arms when the arms are perturbed from a desired working pattern, is to be neglected, assuming that the arms only move according to the desired motion pattern. Based on the assumption, it becomes possible to approximate the model behavior by the inverted pendulum similar to that described as an example in the explanation of the perturbation dynamic model, thereby making the calculation of the model quite simple.

In doing so, it is necessary to calculate, in the main arm controller, the perturbation amount of inertial force and/or gravity of arms when the arms are perturbed from the desired posture to a final desired posture, based on the desired hand position/posture, the desired body position/posture, the final corrected desired hand position/posture and the final corrected desired body position/posture. This can be done by conducting the dynamic calculation of multi-link manipulators (which is known in the art). The results should be expressed in the coordinate system based on the final corrected desired hand position/posture.

The calculated perturbation amount of inertial force and/or gravity should then be added to the object reaction force and the added value should then be forwarded to the object reaction force equilibrium controller as the actual object reaction force.

By conducting these procedures, the influence of the perturbation amount of inertial force and/or gravity of arms (which are neglected in the model) can be taken into account as the object reaction force. Thus, since the calculation of the perturbation amount of inertial force and/or gravity of arms is conducted separately from the calculation of model calculation, no complicated calculations for the interaction is needed, thereby making the volume of calculation small.

As stated above, the foregoing first to fourth embodiments are configured to have a system for controlling posture of a legged mobile robot (the biped walking robot) having at least a body (the body or trunk 28) and a plurality of links (the leg links 2 and arm links 3) each connected to the body, comprising: desired gait predetermining means (the desired working pattern generator) for predetermining a desired gait of the robot including at least a motion pattern including at least a desired trajectory of the body of the robot, a desired trajectory of floor reaction force acting on the robot, and a desired trajectory of external force other than the floor reaction force, acting on the robot; external force detecting means (the force sensor 58) for detecting the external force other than the floor reaction force; external force difference determining means (the object reaction force equilibrium controller, more specifically, the coordinate conversion of actual object reaction force and inputs and outputs thereof shown in FIG. 8) for determining an external force difference or error between the detected external force other than the floor reaction force and the external force of the desired trajectory (i.e., the moment difference or error of object reaction force about the desired total floor reaction force central point); a model (the perturbation dynamic model) expressing a relationship between perturbation of the floor reaction force and perturbation of at least one of a position of center of gravity and a position of the body of the robot; model input amount determining means (the model control law calculator and the downstream adder) for determining a model input amount to be inputted to the model (the desired total floor reaction force moment perturbation amount) based on at least the determined external force difference or error; desired body trajectory correcting amount determining means (the object reaction force equilibrium controller, more specifically, the portion which inputs the perturbation dynamic model input amount, calculates the model behavior and determines the perturbation amount of desired body position/posture (the correcting amount)) for operating to input the model input amount to the model and based on a perturbation amount of at least one of the position of center of gravity and the position of the body obtained therefrom, for determining a desired body trajectory correcting amount, which corrects the desired trajectory of the body (the corrected desired body position/posture); desired floor reaction force trajectory correcting amount determining means (the model control law calculator, more specifically a portion of the model control law) for determining a desired floor reaction force trajectory correcting amount, which corrects the desired trajectory of the floor reaction force (the compensating moment of total floor reaction force for object reaction force equilibrium control), based on at least the determined model input amount; and joint displacing means (main leg controller, actuator driver 88, leg actuators, etc.) for displacing joints of the robot based on at least the determined desired body trajectory correcting amount and the desired floor reaction force trajectory correcting amount.

It is configured in the system, the model input amount determining means includes: equilibrium center of gravity position perturbation amount determining means (the final desired center of gravity position perturbation amount calculator) for determining a perturbation amount of an equilibrium position of the center of gravity at which the external force is statically balanced; and wherein the model input amount determining means determines the model input amount such that the model converges to perturbation amount of the equilibrium position of the center of gravity.

It is configured in the system, the model is a model (the perturbation dynamic model) which approximates the robot by an inverted pendulum.

It is configured in the system, the equilibrium center of gravity position perturbation amount determining means includes: a limiter (the limiters 200, 400) which limits the determined perturbation amount of equilibrium position of center of gravity within a predetermining range.

It is configured in the system, the desired floor reaction force trajectory correcting amount determining means includes: a limiter (the limiters 300, 500) which limits the determined desired floor reaction force trajectory correcting amount within a predetermined range.

It is configured in the system, the desired trajectory of the floor reaction force includes at least a desired trajectory of a central point of the floor reaction force acting on the robot.

It is configured in the system, the desired floor reaction force trajectory correcting amount determining means determines the desired floor reaction force trajectory correcting amount such that the desired floor reaction force trajectory correcting amount (the compensating moment of total floor reaction force for object reaction force equilibrium controller) is equal to a difference or error obtained by subtracting the external force difference or error (the moment difference or error of object reaction force about the desired total floor reaction force central point) from the model input amount (the desired total floor reaction fore moment perturbation amount for model).

It is configured in the system, the external force other than the floor reaction force is a reaction force acting on the robot from an object (the truck 100) through the links.

It is configured in the system, the robot is a legged mobile robot having two leg links and two arm links each connected to the body.

The foregoing first to fourth embodiments are further configured to have a system for controlling a posture of a legged mobile robot having at least a body (the body or trunk 28) and a plurality of links (the leg links 2 and arm links 3) each connected to the body, comprising: desired gait predetermining means (the desired working pattern generator) for predetermining desired gait of the robot including at least a motion pattern including at least a desired position of the body of the robot and a trajectory of a desired central point of floor reaction force acting on the robot; object reaction force detecting means (the force sensor 58) for detecting an object reaction force acting on the robot from an object through the links; object reaction force moment converting means (the object reaction force equilibrium controller) for converting or transforming the detected object reaction force into a moment about the desired central point of the floor reaction force; robot position/posture correcting means (the object reaction force equilibrium controller) for correcting the moment of the floor reaction force about the desired central point of the floor reaction force and a position and posture of the robot so as to dynamically counterbalance the converted moment of the object reaction force; and joint displacing means (main leg controller, actuator driver 88, leg actuators, etc.) for displacing joints of the robot based on the corrected moment of the floor reaction force about the desired central point of the floor reaction force and the corrected position and posture of the robot.

The foregoing first to fourth embodiments are further configured to have a system for controlling posture of a legged mobile robot having at least a body (the body or trunk 28) and a plurality of links (the leg links 2 and arm links 3) each connected to the body, comprising: desired gait predetermining means (the desired working pattern generator) for predetermining a motion pattern including at least a desired position of the body of the robot; object reaction force detecting means (the force sensor 58) for detecting an object reaction force acting on the robot from an object through the links; object reaction force moment converting means (the object reaction force equilibrium controller) for converting the detected object reaction force into a moment about a predetermined point (more specifically the moment about the desired floor reaction force central point); robot position/posture correcting means (the object reaction force equilibrium controller) for correcting a moment of a floor reaction force about the predetermined point and a position and/or posture of the robot so as to dynamically counterbalance the converted moment; and joint displacing means (main leg controller, actuator driver 88, leg actuators, etc.) for displacing joints of the robot based on the corrected moment of the floor reaction force about the predetermined point of the floor reaction force and the corrected position and/or posture of the robot.

In the foregoing first to fourth embodiments, no actuator is provided for bending or twisting the body link. If such a body actuator is added, it will be necessary to provide a control system for the body actuator. Since the bending or twisting of the body link is equivalent to have additional joints at the connecting points where the arms or legs are connected to the body, the actuator will be considered to be a kind of arm or leg actuator. Thus, the body actuator can be treated as a part of the main arm controller or main leg controller.

In the foregoing first to fourth embodiments, although the compliance control proposed in Japanese Laid-open Patent Application No. Hei 5 (1993)-305586 is used, it is alternatively possible to use any other control techniques. If the joint torques are controlled using the technique to control the electric actuators with current-command-type amplifiers such that the floor reaction force is controlled indirectly, the force sensor 56 provided at the feet 22R(L) will no longer be needed.

In the foregoing first to fourth embodiments, it is alternatively possible to provide, instead of the force sensor provided at the respective hands, an estimator which estimates the actual object reaction force from the joint torque. A known disturbance observer can be used as the estimator.

In the foregoing first to fourth embodiments, moreover, it is alternatively possible to utilize the control proposed by the applicant in Japanese Laid-open Patent Application Hei 5(1993)-337849, in addition to the compliance control proposed by the applicant in Japanese Laid-open Patent Application Hei 5(1993)-305586. Since, however, the body position or stride is corrected by the additional control, it becomes necessary to take the influence of the corrected body position or stride into account, if the relative relationship between the robot hand and the object is significant.

In the foregoing first to fourth embodiments, furthermore, it is alternatively possible to utilize the technique, provided by the applicant in Japanese Laidopen Patent Application No. 5 (1993)-318840, to suppose a virtual flat floor such that the desired total floor reaction force central point or the desired ZMP are determined on that virtual flat floor, if the floor is not flat.

In the foregoing first to fourth embodiments, furthermore, if the posture of the robot deviates from the desired posture and tilts, the position and/or posture of the hand also deviates from the desired value in the absolute space. As a result, the object reaction force may sometimes deviate from the desired object reaction force greatly.

In order to solve this problem, it is more preferable to further correct the aforesaid final desired hand position/posture based on the difference or error between the actual body position/posture detected by the inclination sensor and the desired body position/posture such that the hands will not be out of the desired position/posture in the absolute space, even when the robot tilts.

In the first to fourth embodiments, it is possible to modify the block diagrams illustrated, by, for example, the calculation sequence is changed.

In the first to fourth embodiments, although the PD control laws are used, it is alternatively possible to use any other control laws, such as those in the PID (Proportional-Integral-Differential) control or state feedback control laws.

In the foregoing embodiments, although the present invention has been described with reference to a biped robot, the present invention can be applied to other legged mobile robots.

Industrial Field in which the Invention is Applicable

According to the present invention, it becomes possible to control the legged mobile robot to preserve the dynamic balance so as to maintain a stable posture, even when the robot is subject to unexpected external force, more specifically, unexpected reaction force from an object.

Moreover, it becomes possible to control the legged mobile robot to preserve the dynamic balance so as to maintain a stable posture, if the robot is subject to not only the gravity and inertial force generated by the arms when the robot is controlled to move the arm (more particularly the arms in accordance with unanticipated motion pattern), but also unexpected reaction force from an object.

Furthermore, it becomes possible to prevent the legged mobile robot from tilting or tipping, even if the object reaction force changes abruptly, by displacing the position of the center of gravity of the robot to a position at which the balance is statically achieved. It also becomes possible to keep the dynamic balance by varying the position of the center of gravity of the robot or the floor reaction force properly even under transient during which the displacement of center of gravity is in progress.

What is claimed is:

1. A system for controlling posture of a legged mobile robot having at least a body and a plurality of links each connected to the body, comprising:
   a. desired gait determining means for determining a desired gait of the robot including at least a motion pattern including at least a desired trajectory of the body of the robot, a desired trajectory of floor reaction force acting on the robot, and a desired trajectory of external force other than the floor reaction force, acting on the robot through a portion of at least one of the links other than the link or links that contact a floor;
   b. external force detecting means for detecting the external force other than the floor reaction force;
   c. external force difference determining means for determining an external force difference between the detected external force other than the floor reaction force and the external force of the desired trajectory;
   d. a model expressing a relationship between perturbation of the floor reaction force and perturbation of at least one of a position of center of gravity and a position of the body of the robot;
   e. model input amount determining means for determining a model input amount to be inputted to the model based on at least the determined external force difference;
   f. desired body trajectory correcting amount determining means for operating to input the model input amount to the model and based on a perturbation amount of at least one of the position of center of gravity and the position of the body obtained therefrom, for determining a desired body trajectory correcting amount, which corrects the desired trajectory of the body;
   g. desired floor reaction force trajectory correcting amount determining means for determining a desired floor reaction force trajectory correcting amount, which corrects the desired trajectory of the floor reaction force, based on at least the determined model input amount; and
   h. joint displacing means for displacing joints of the robot based on at least the determined desired body trajectory correcting amount and the desired floor reaction force trajectory correcting amount.

2. A system according to claim 1, wherein the model input amount determining means includes:
   i. equilibrium center of gravity position perturbation amount determining means for determining a perturbation amount of an equilibrium position of the center of gravity at which the external force is statically balanced;

and wherein the model input amount determining means determines the model input amount such that the model converges to the perturbation amount of equilibrium position of the center of gravity.

3. A system according to claim 1 or 2, wherein the model is a model which approximates the robot by an inverted pendulum.

4. A system according to claim 1 or 2, wherein the equilibrium center of gravity position perturbation amount determining means includes:
a limiter which limits the determined perturbation amount of equilibrium position of center of gravity within a predetermining range.

5. A system according to claim 1 or 2, wherein the desired floor reaction force trajectory correcting amount determining means includes:
a limiter which limits the determined desired floor reaction force trajectory correcting amount within a predetermined range; and
joint displacing means for displacing joints of the robot based on the corrected moment about the desired central point and the corrected position and/or posture of the robot.

6. A system according to claim 1 or 2, wherein the desired trajectory of the floor reaction force includes at least a desired trajectory of a central point of the floor reaction force acting on the robot.

7. A system according to claim 6, wherein the desired floor reaction force trajectory correcting amount determining means determines the desired floor reaction force trajectory correcting amount such that the desired floor reaction force trajectory correcting amount is equal to a difference obtained by subtracting the external force difference from the model input amount.

8. A system according to claim 1 or 2, wherein the external force other than the floor reaction force is a reaction force acting on the robot from an object through the links.

9. A system according to claim 1 or 2, wherein the robot is a legged mobile robot having two leg links and two arm links each connected to the body.

10. A system for controlling a posture of a legged mobile robot having at least a body, and a plurality of leg links and a plurality of arm links each connected to the body, comprising:
a. desired gait predetermining means for predetermining desired gait of the robot including at least a motion pattern including at least a desired position of the body of the robot and a trajectory of a desired central point of floor reaction force acting on the robot;
b. object reaction force detecting means provided at each end of the arm links or detecting an object reaction force acting on the robot from an object through at least one of the arm links;
c. object reaction force moment converting means for converting the detected object reaction force into moment about the desired central point of the floor reaction force;
d. robot position/posture correcting means for correcting the moment of the desired floor reaction force about the desired central point and a position and posture of the robot so as to dynamically counterbalance the converted moment of the object reaction force; and
e. joint displacing means for displacing joints of the robot based on the corrected moment about the desired central point and at least one of the corrected position and posture of the robot.

11. A system for controlling posture of a legged mobile robot having at least a body, and a plurality of links and a plurality of arm links each connected to the body, comprising:
a. desired gait predetermining means for predetermining a motion pattern including at least a desired position of the body of the robot;
b. object reaction force detecting means provided at each end of the arm links for detecting an object reaction force acting on the robot from an object through at least one of the arm links;
c. object reaction force moment converting means for converting the detected object reaction force into a moment about a predetermined point;
d. robot position/posture correcting means for correcting a moment about the predetermined point and a position and posture of the robot so as to dynamically counterbalance the converted moment; and
e. joint displacing means for displacing joints of the robot based on the corrected moment of the floor reaction force about the predetermined point and at least one of the corrected position and posture of the robot.

12. A method for controlling posture of a legged mobile robot having at least a body and a plurality of links each connected to the body, the method comprising:
a. determining a desired gait of the robot including at least a motion pattern including at least a desired trajectory of the body of the robot, a desired trajectory of floor reaction force acting on the robot, and a desired trajectory of external force other than the floor reaction force, acting on the robot through a portion of at least one of the links other than the link or links that contact a floor;
b. detecting the external force other than the floor reaction force;
c. determining an external force difference between the detected external force other than the floor reaction force and the external force of the desired trajectory;
d. modeling a relationship between perturbation of the floor reaction force and perturbation of at least one of a position of center of gravity and a position of the body of the robot;
e. determining a model input amount to be inputted to the model based on at least the determined external force difference;
f. inputting the model input amount to the model and based on a perturbation amount of at least one of the position of center of gravity and the position of the body obtained therefrom, determining a desired body trajectory correcting amount, which corrects the desired trajectory of the body;
g. determining a desired floor reaction force trajectory correcting amount, which corrects the desired trajectory of the floor reaction force, based on at least the determined model input amount; and
h. displacing joints of the robot based on at least the determined desired body trajectory correcting amount and the desired floor reaction force trajectory correcting amount.

13. A method according to claim 12, wherein the model input amount determining step includes:
i. determining a perturbation amount of an equilibrium position of the center of gravity at which the external force is statically balanced; and wherein
the model input amount determining step determines the model input amount such that the model converges to the perturbation amount of equilibrium position of the center of gravity.

14. A method according to claim 13, wherein the step of determining a perturbation amount of an equilibrium position of the center of gravity at which the external force is statically balanced includes:

limiting the determined perturbation amount of equilibrium position of center of gravity to a predetermined range.

15. A method according to claim 12 or 13, wherein the step of modeling includes approximating the robot by an inverted pendulum.

16. A method according to claim 12 or 13, wherein the step of determining a desired floor reaction force trajectory correcting amount includes:

limiting the determined desired floor reaction force trajectory correcting amount to a predetermined range.

17. A method according to claim 12 or 13, wherein the step of determining a desired gait of the robot including a desired trajectory of floor reaction force acting on the robot uses at least a central point of the floor reaction force acting on the robot.

18. A method according to claim 17, wherein the step of determining a desired floor reaction force trajectory correcting amount, which corrects the desired trajectory of the floor reaction force, determines the desired floor reaction force trajectory correcting amount such that the desired floor reaction force trajectory correcting amount is equal to a difference obtained by subtracting the external force difference from the model input amount.

19. A method according to claim 12 or 13, wherein the step of detecting the external force other than the floor reaction force detects at least a reaction force acting on the robot from an object through the links.

20. A method according to claim 12 or 13, further comprising:

providing a robot that is a legged mobile robot having two leg links and two arm links each connected to the body.

* * * * *